United States Patent
Bernstein et al.

(10) Patent No.: US 7,302,425 B1
(45) Date of Patent: Nov. 27, 2007

(54) DISTRIBUTED PRE-CACHED QUERY RESULTS AND REFRESH METHOD

(75) Inventors: Simon D. Bernstein, Seattle, WA (US); Xiongjian Fu, Sammamish, WA (US); Nishant Dani, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 10/458,511

(22) Filed: Jun. 9, 2003

(51) Int. Cl.
 *G06F 17/30* (2006.01)
 *G06F 12/00* (2006.01)
 *G06F 13/28* (2006.01)

(52) U.S. Cl. .......................... 707/3; 711/129
(58) Field of Classification Search ............... 707/1–10, 707/100–104.1, 200–205; 711/129, 146
See application file for complete search history.

(56) References Cited

U.S. PATENT DOCUMENTS

| | | | |
|---|---|---|---|
| 5,220,667 A | 6/1993 | Ichieda | |
| 5,333,311 A | 7/1994 | Whipple | |
| 5,713,008 A | 1/1998 | Falkner | |
| 5,950,007 A | 9/1999 | Nishiyama | |
| 6,073,232 A | 6/2000 | Kroeker | |
| 6,347,312 B1 * | 2/2002 | Byrne et al. .................. | 707/3 |
| 6,519,592 B1 * | 2/2003 | Getchius et al. ............... | 707/6 |
| 6,615,317 B2 * | 9/2003 | Roseborough et al. ...... | 711/129 |
| 7,007,034 B1 * | 2/2006 | Hartman et al. ............. | 707/102 |

OTHER PUBLICATIONS

English, R.M, and A.A. Stepanov, "Loge: A Self-Organizing Disk Controller," Proceedings of USENIX Winter 1992 Technical Conference, San Francisco, Jan. 20-24, 1992, pp. 237-251.
Griffioen, J., and R. Appleton, "Reducing File System Latency Using a Predictive Approach," Proceedings of USENIX Summer 1994 Technical Conference, Boston, Jun. 6-10, 1994, pp. 197-207.
Kroeger, T.M., and D.E. Long, "Predicting Future File-System Actions From Prior Events," Proceedings of USENIX 1996 Annual Technical Conference, San Diego, Jan. 22-26, 1996, pp. 319-328.
Palmer, M., and S.B. Zdonik, "Fido: A Cache That Learns to Fetch," Proceedings of the 17th International Conference on Very Large Data Bases, Barcelona, Spain, Sep. 1991, pp. 255-264.

(Continued)

*Primary Examiner*—Hosain Alam
*Assistant Examiner*—Navneet K Ahluwalia
(74) *Attorney, Agent, or Firm*—Christensen O'Connor Johnson Kindness PLLC

(57) ABSTRACT

Query results are pre-cached for a substantial portion of or all queries that are likely to be issued by users. One query can be entirely different from another query, yet because corresponding query results are pre-cached, the database need not be accessed, improving response performance. Pre-cached queries are also distributed into multiple partitions to apportion work among multiple computing machines to further enhance performance and provide redundancy in case of the failure of any particular partition. Pre-cached query results are selectively refreshed so that users may enjoy up-to-date information by focusing on queries that are popular as well as queries that are old.

68 Claims, 17 Drawing Sheets

OTHER PUBLICATIONS

Patterson, R.H., et al., "Informed Prefetching and Caching," Proceedings of the 15th ACM Symposium on Operating System Principles, Copper Mountain Resort, Colorado, Dec. 3-6, 1995, pp. 79-95.

Staelin, C., and H. Garcia-Molina, "Smart Filesystems," Proceedings of USENIX Winter 1991 Technical Conference, Dallas, Jan. 1991, pp. 45-51.

Tait, C.D., and D. Duchamp, "Detection and Exploitation of File Working Sets," Proceedings of 11th International Conference on Distributed Computing Systems, IEEE, Arlington, Texas, May 20-24, 1991, pp. 2-9.

Hatfield, D.J., and J. Gerald, "Program Restructuring for Virtual Memory," IBM Systems Journal 10(3):168-192, 1971.

* cited by examiner

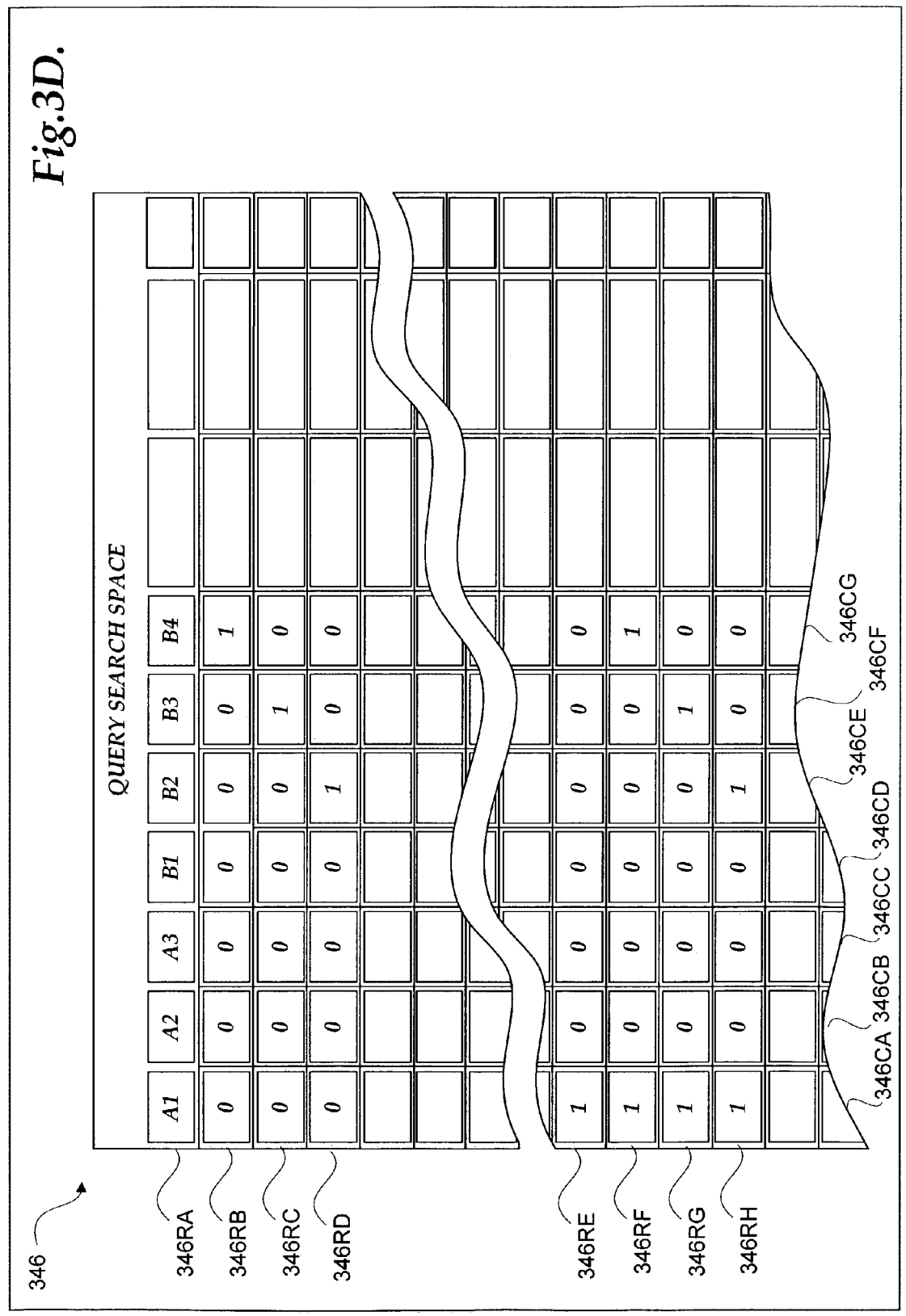

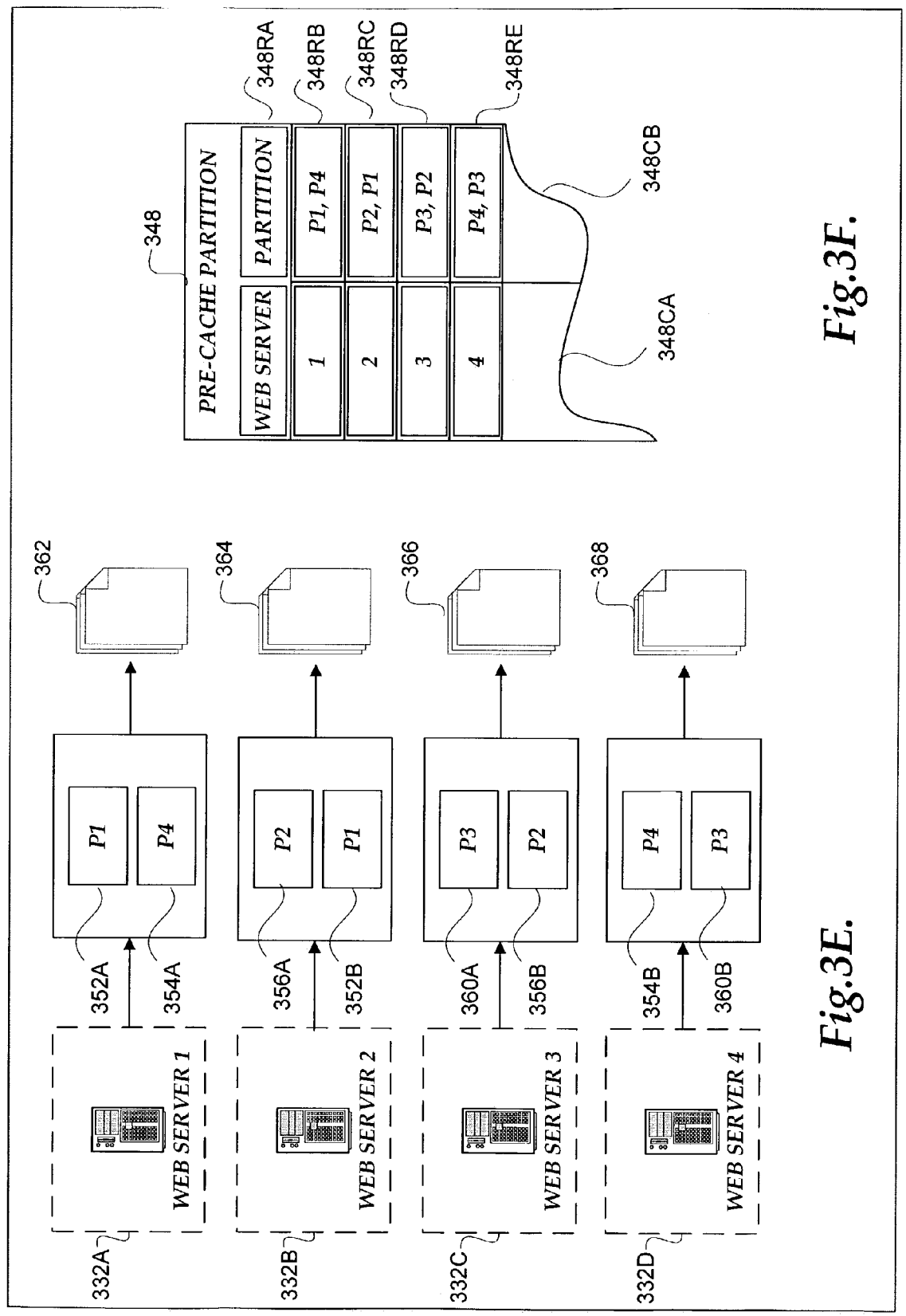

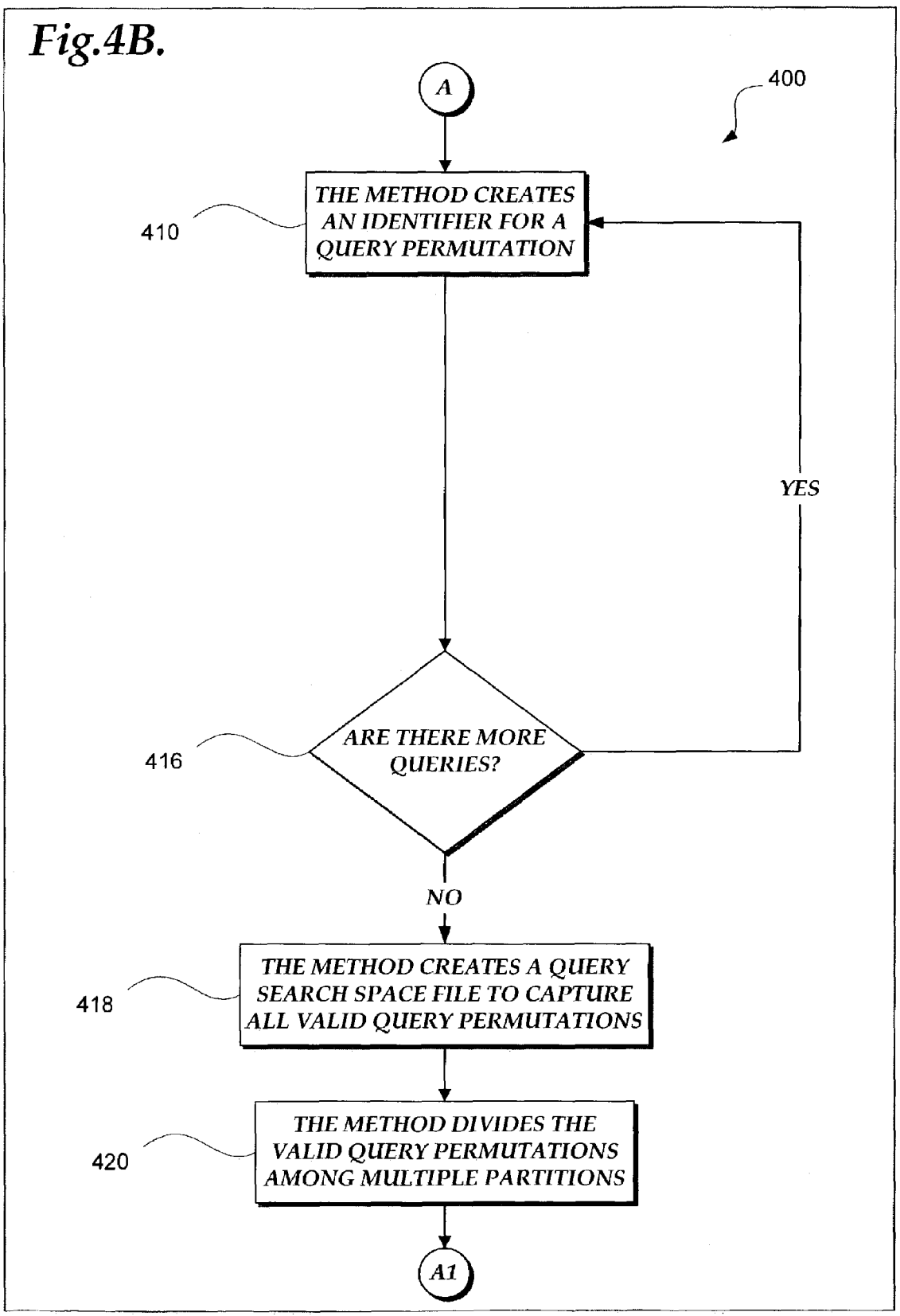

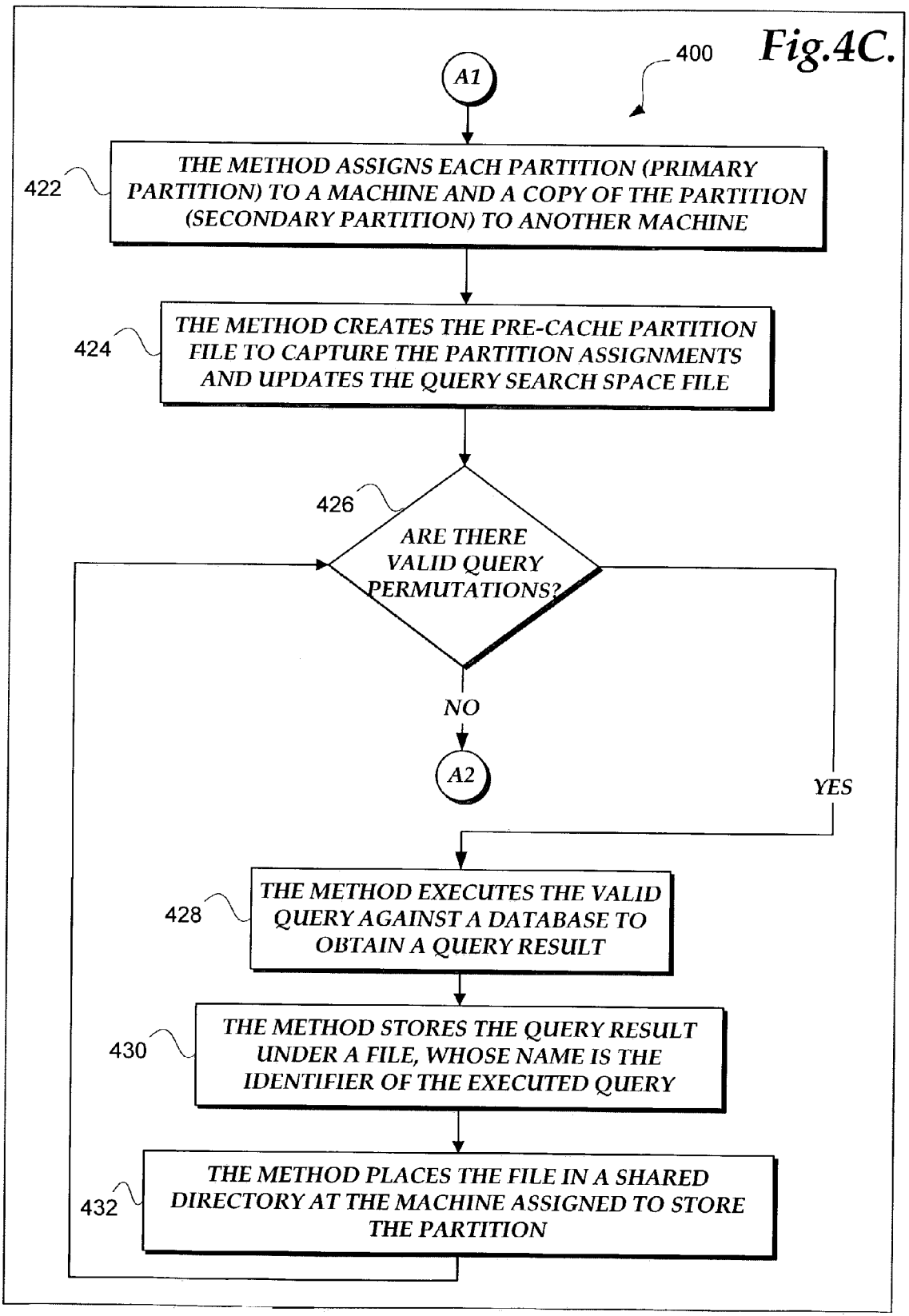

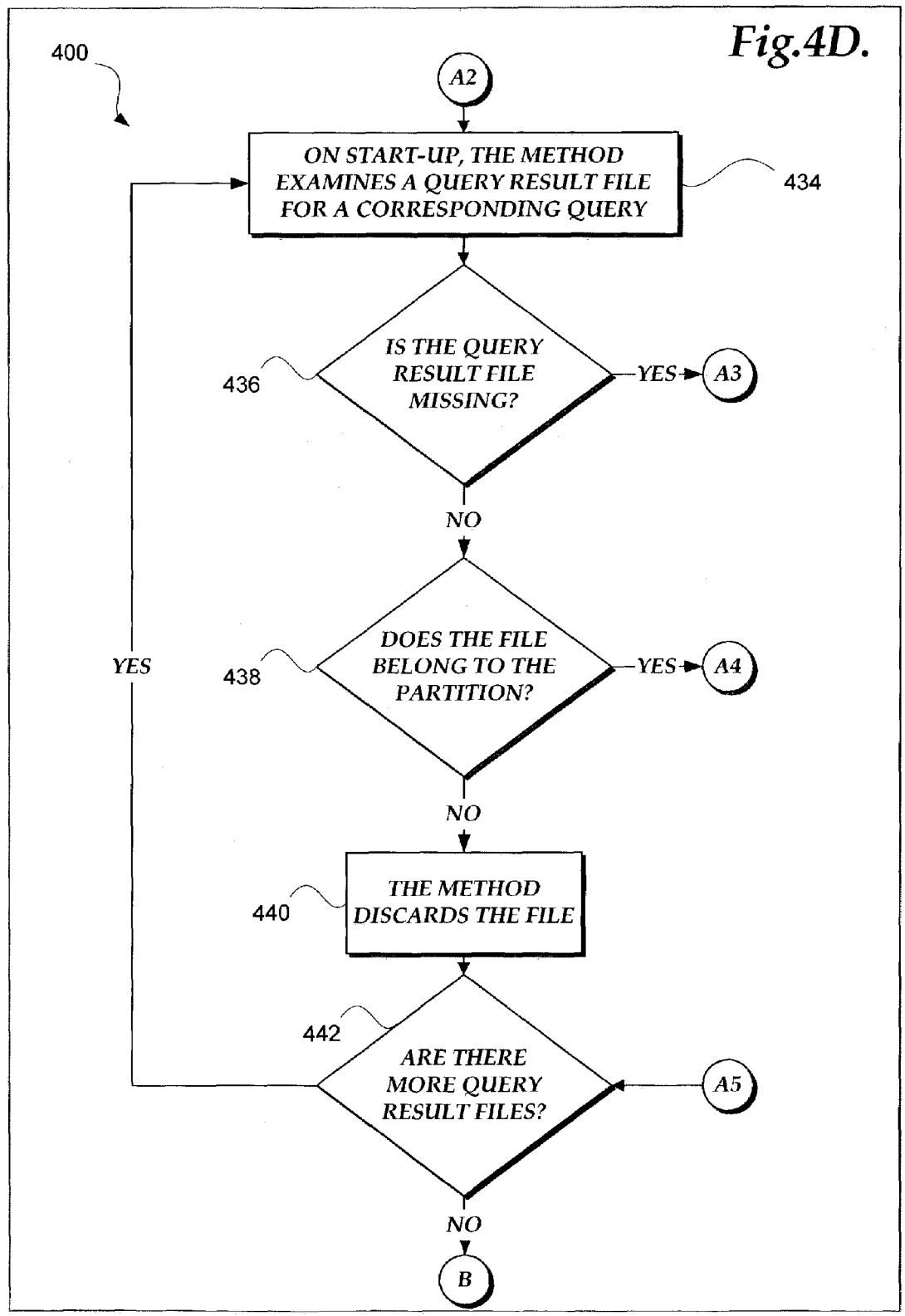

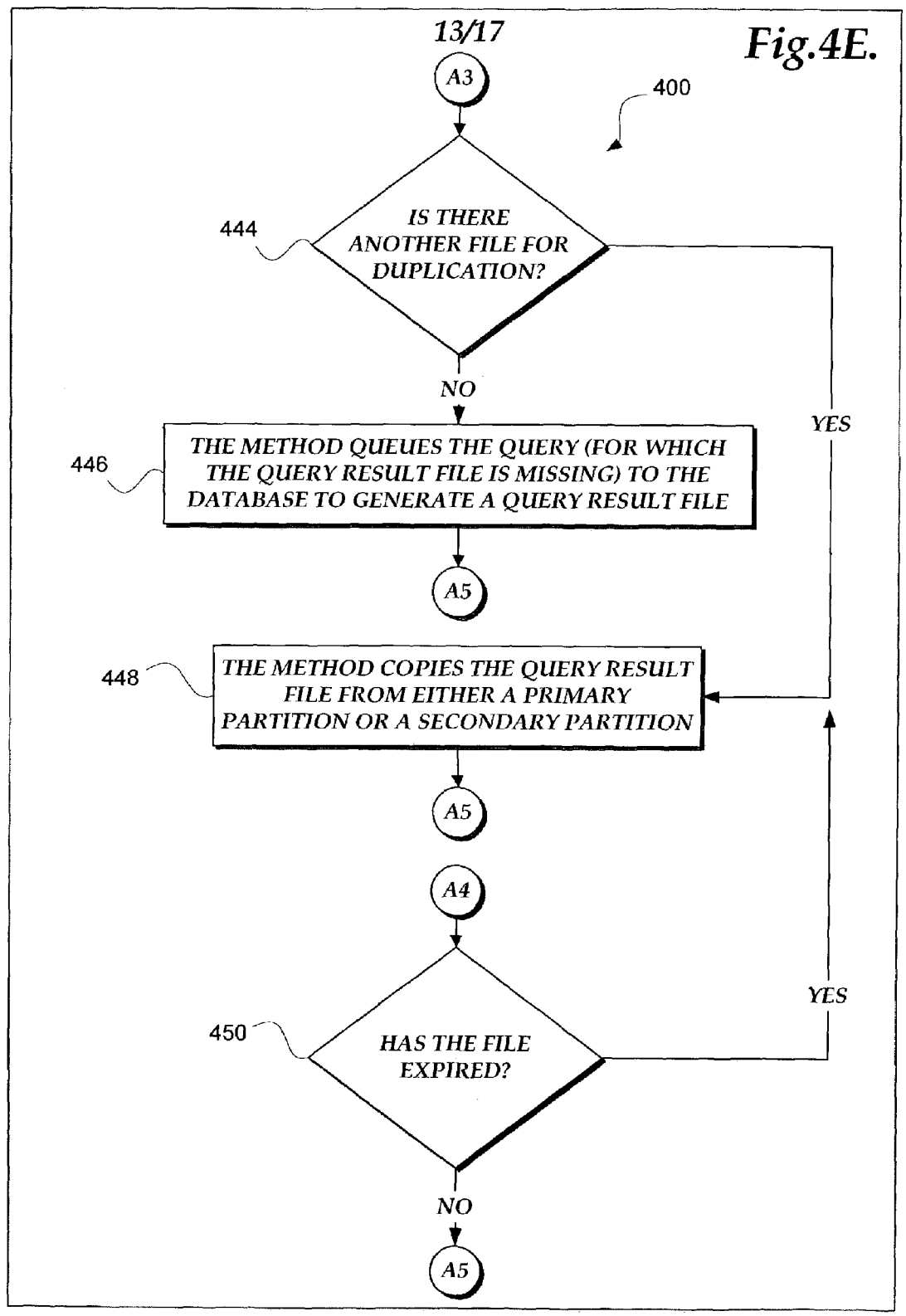

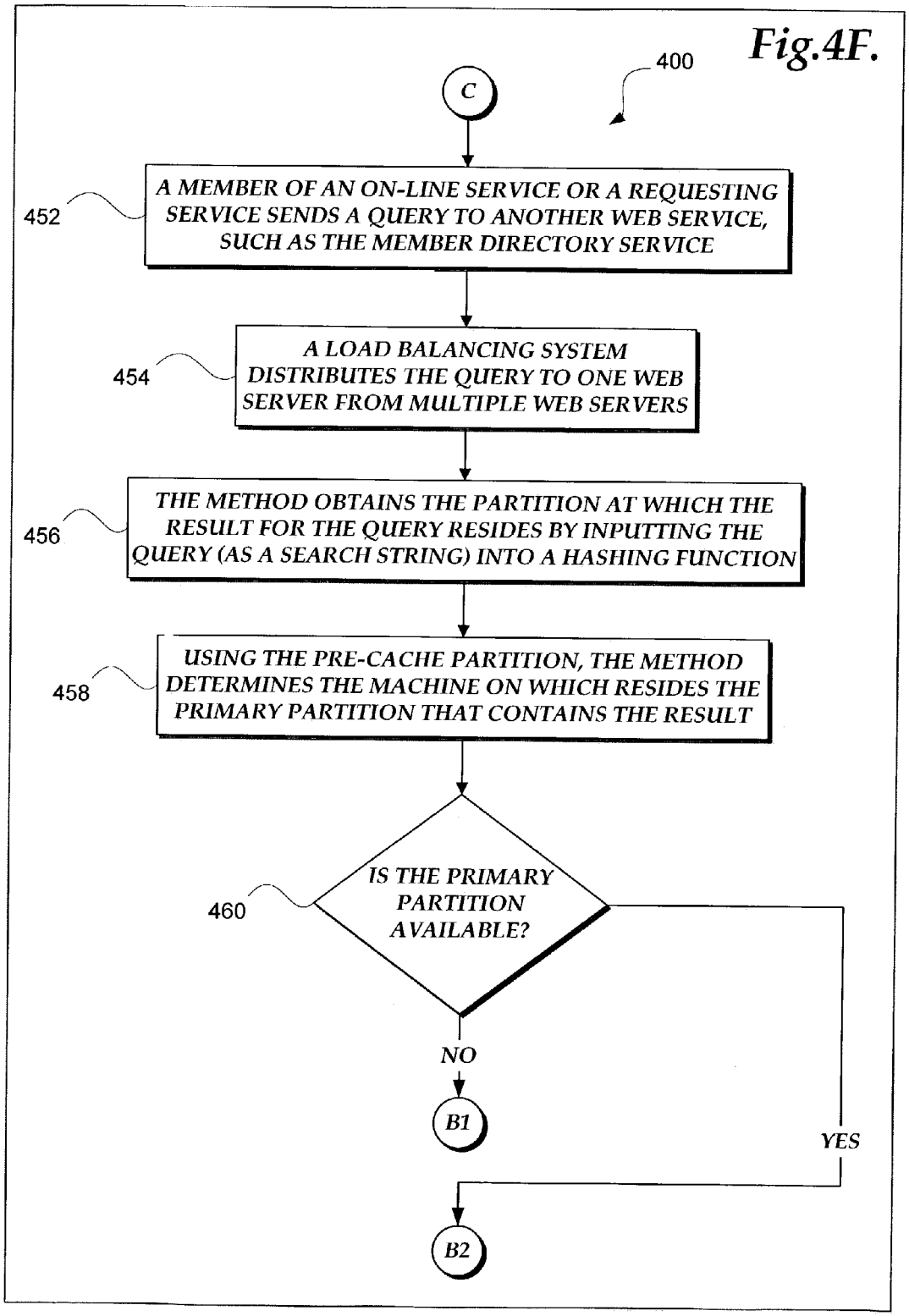

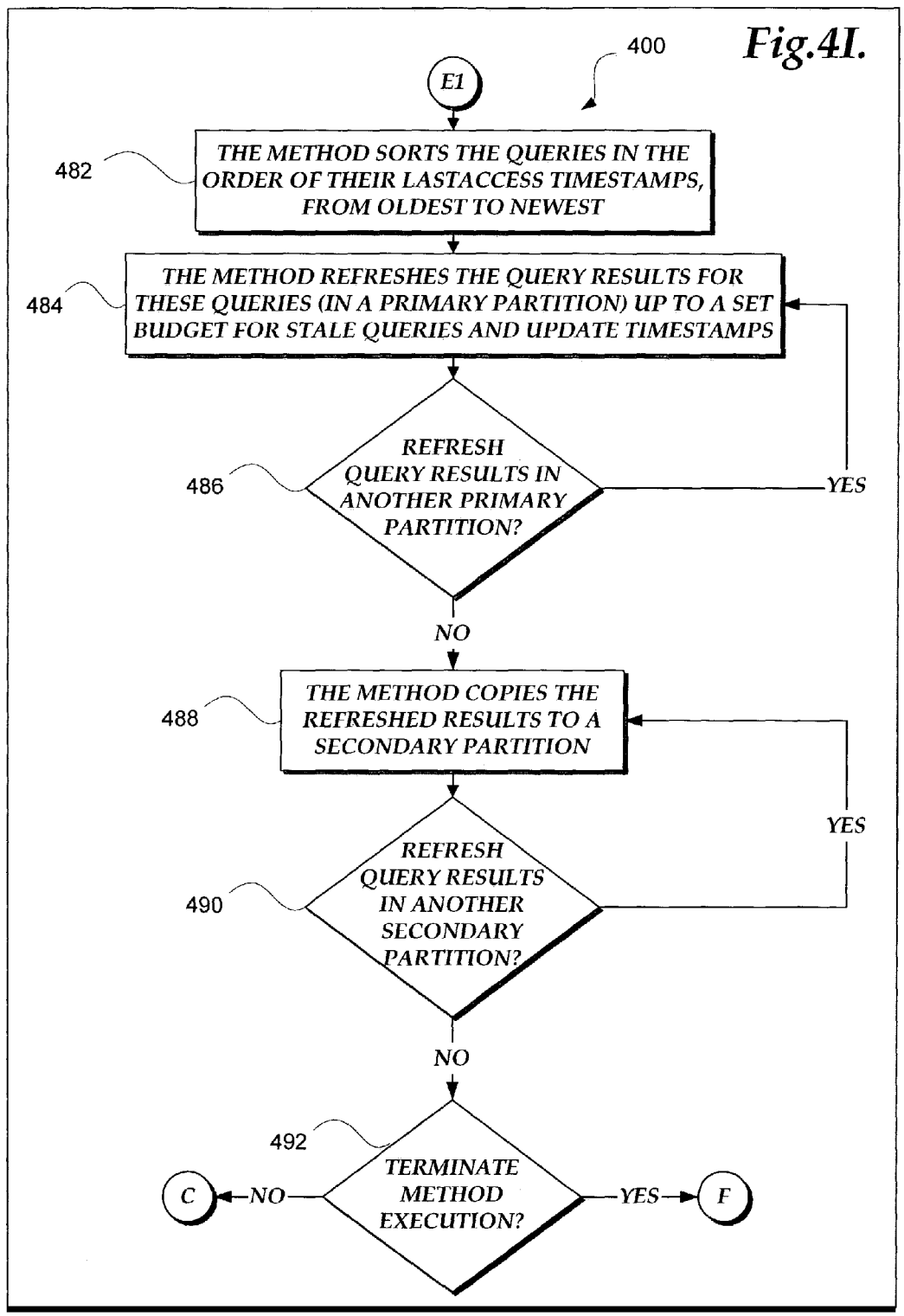

DISTRIBUTED PRE-CACHED QUERY RESULTS AND REFRESH METHOD

FIELD OF THE INVENTION

The present invention relates generally to servers that respond to requests of clients, and more particularly, to a large collection of data organized especially for rapid search, retrieval, and refresh.

BACKGROUND OF THE INVENTION

Information that can never be found is neither valuable nor of great use. Useful information on a computer can be found by searching, which is a process of seeking a particular or specific piece of data, and is carried out by a program through comparison or calculation to determine whether a match to some pattern exists or whether some other criteria have been met. Much information is available to computers on the World Wide Web, which is the total set of interlinked hypertext documents residing on servers around the world.

Search engines can be used to search for and within documents on the World Wide Web. These documents called Web pages are written in HTML (hypertext mark-up language), identified by URLs (uniform resource locators) that specify the particular machine and path name by which the document file can be accessed, and are transmitted from server to end user via HTTP (hypertext transfer protocol). Codes, called tags, embedded in an HTML document associate particular words and images in the document with URLs so that a user can access another file, which may be on another server half way around the world, at the press of a key or the click of a mouse. These files may contain text (in a variety of fonts and styles), graphics, images, movie files, and sound, as well as Java applets, ActiveX controls, or other small embedded software programs that execute when the user activates them.

Through search engines, people use can present search requests (queries), which are formed from a data manipulation language for retrieving and displaying pieces of data from one or more databases. A search engine responds to a person's query by searching one or more databases and displaying one or more documents that match the query. Typically, a person uses a browser on a client computer to present a query, and a search engine uses a database on a server computer to respond to the query. Together, the client computer and server computer form a type of computer network architecture called a client/server architecture.

Client/server architecture is an arrangement that makes use of distributed intelligence, treating both the server and the individual workstations as intelligent, programmable devices, thus exploiting the full computing power of each. This is done by splitting the processing of an application, such as a search process, between two distinct components: a "front-end" client and a "back-end" server. The client component, itself a complete, stand alone personal computer (versus the "dumb" terminal found in older architectures), offers the user its full range of power and features for running applications. The server component, which can be another personal computer, minicomputer, or mainframe, enhances the client component by providing the traditional strengths offered by minicomputers and mainframes in a time-sharing environment, such as data storage, data management, information sharing among clients, and sophisticated network administration and security features.

The server component allows information on the World Wide Web to become useful because of the server component's storage and retrieval capabilities. The server component's disk drives and other storage media represent facilities for holding information on a permanent basis, allowing retrieval at a later time by either the server component or the client component. In the initial days of the World Wide Web, its intrepid early users found only limited information. Now, millions of users across the globe demand that companies provide continuous access to information that must be quickly retrievable at all times of day and night. Failure to meet these expectations means rapid expiration of users' patience, and with a click of a mouse button these users can visit a competitor's Web site.

Rapid retrieval of information is not effortless even with the blazing power and speed of today's databases because of the sheer size of stored information and the ever-growing number of its users. It is easy to find information when there are only a few pieces to look through—not so when there are millions. It is also easy to service the queries of only a few users but to satiate the desires of a global online population is much more difficult. The most knotty problem of all, however, is that each user tends to present a query that is not similar let alone identical, to the query of another user, making the optimization of retrieval performance difficult (i.e., if all queries were identical, a query result for one user could be immediately reused for all users). One solution, albeit an expensive one, is to add additional processing capacity to accommodate the increasing amount of information and the growing number of users, but this raises not only the costs of procuring equipment but also the costs of operating the equipment. A system 100 in FIG. 1 illustrates this problem as well as other problems in greater detail.

The system 100 includes multiple users 102A-102C using personal computers 103A-103C, each a representative of the client component, to access a database 126, which is representative of the server component. Three users 102A-102C are illustrated for brevity purposes and ease of discussion but these three users represent the continuously growing millions of users. Personal computers 103A-103C allow users 102A-102C to access online services offered by the database 126 via a network 122. The network 122 is a group of computers and associated devices that are connected by communication facilities and can range in size from only a few computers, printers, and other devices, to many large group of small and large computers, which can even be distributed over a vast geographic area.

Web browsers 104A-104C are software running on personal computers 103A-103C that let users 102A-102C view HTML documents and access files and software related to those documents on the database 126. Browsers 104A-104C include a number of tools for navigation, such as Back buttons 108A-108C, Forward buttons 110A-110C, and Home buttons 1112A-112C. These buttons are positioned on navigation bars 106A-106C. Rightward of these bars 106A-106C is the name of the Web page ("HOME") being displayed. Web pages 114A-114C present find functions 116A-116C allowing users 102A-102C to search for desired information in the database 126. Text boxes 118A-118C are elements of dialog boxes or HTML forms in which users 102A-102C may enter text to form queries. When one of the users 102A-102C has entered the query into one of the text boxes 118A-118C, the user may press the Enter key of a keyboard (not shown) coupled to the personal computer 103A-103C or may select an OK button 102A-102C to present the query. This query is transmitted through the network 122 to be executed on the database 126 to obtain a query result containing a desired piece of information. The query result is then sent back to a user among users 102A-102C who have originated the query.

A better solution than the economically prohibitive solution of spending more money to buy more equipment is the use of a cache 124, which provides on-demand cache services. But the cache 124 offers only a partial answer. The cache 124 is a portion of data storage in the server component apart from the database 126 for temporarily holding information without having to access the database 126. Information that has either been recently read from or written to the database 126 can be held in the cache 124 so that a next query for the same information can be satisfied not by executing the query in the database 126 but by merely copying the information already in the cache 124. However, if the next query is directed to a different piece of information, the cache 124 will be bypassed, and the next query will have to be executed in the database 126 to find the desired information, hence eliminating the usefulness of the cache 124.

As an example, suppose that the user 102A issues a query to find "CASCADIA". See text box 118A. This query is executed by the database 126 to form a query result. The database 126 returns the query result to the user 102A which can be displayed on the browser 104A. The query result of the query "CASCADIA" query is temporarily stored in the cache 124. Suppose that the user 102B now issues a query to find "OLYMPICS." Because the query "OLYMPICS" is not at all similar or identical to the query "CASCADIA," the query result for the query "CASCADIA," which is stored in the cache 124 cannot be used to respond to the query "OLYMPICS." Therefore, the query "OLYMPICS" must be executed in the database 126 to find a corresponding query result. The database 126 returns the query result to the user 102B by displaying the query result on the browser 104B. The query result for the query "OLYMPICS" as well as the query result for the query "CASCADIA" are now stored on the cache 124. As can be seen, the cache 124 is helpful only if the queries of users 102A, 102B are identical. Otherwise, the database 126 will have to be accessed anyway to find query results for queries not stored in the cache 124. As a final example, the user 102C issues a query "CASCADEA." See text box 118C. Because the query "CASCADEA" is completely different from queries "CASCADIA" and "OLYMPICS," the cache 124 has no query result that can be used to immediately respond to the query "CASCADEA." Thus, once again, the database 126 must be accessed to find the query result for the query "CASCADEA." Failure of the cache 124 to provide readied query results sets the retrieval problem back to square one.

Database searching is a problem, especially on the Internet, where many users are present, many pieces of information are stored, and many different searches are requested. Users get easily frustrated and impatient if their requests are not serviced within a short amount of time. Adding more database servers is not acceptable because of the prohibitive costs involved in procurement and maintenance. On-demand caching is a partial solution, but due to the wide variations among queries, the cache cannot contain readied results, and the databases must be accessed anyway. Moreover, certain queries may take so long a time to search that their performance will not be tolerated by users on the Internet.

While these problems and others discussed above are in the context of Internet searches, other database searches have similar if not identical problems when there are many users, many pieces of information, and many different queries. Without resolution to the problem of responding efficiently to users' queries, users may eventually no longer trust the system 100 to provide a desired computing experience that can reproduce stored pieces of information within a short period of time, and demand for the system 100 will diminish in the marketplace. Thus, there is a need for a system, method, and computer-readable medium for responding to queries while avoiding or reducing the foregoing and other problems associated with existing systems.

SUMMARY OF THE INVENTION

In accordance with this invention, a system, method, and computer-readable medium for responding to queries of users is provided. The system form of the invention includes a networked system for responding to a query of a user and comprises an application for issuing the query and a service for responding to the query by providing a corresponding query result. The corresponding query result is found in a set of pre-cached query results. Each pre-cached query result is generated by executing a corresponding query prior to issuance of the corresponding query.

In accordance with further aspects of this invention, the system form of the invention includes a computer system for responding to queries of users that comprises multiple servers for responding to the queries of the users and multiple partitions distributed on multiple servers. Each partition contains a portion of pre-cached query results. Each pre-cached query result is generated by executing a corresponding query prior to the time the corresponding query is requested by a user.

In accordance with further aspects of this invention, the system form of the invention includes a computer system for responding to queries of users that comprises a hashing component for mapping a query to a partition on a server and a lookup component for mapping the query to a filename of a file in a partition and on the server. The file contains a query result for the query. The query result is pre-cached prior to the issuance of the query by a user. The computer system further comprises a refresh component for refreshing the query result so that the data in the query result is up to date.

In accordance with further aspects of this invention, a computer-readable medium form of the invention includes a data structure stored thereon for use by a computing system to respond to queries of users. The data structure comprises an identifier field that is indicative of a query permutation.

In accordance with further aspects of this invention, a computer-readable medium form of the invention includes a data structure stored thereon for use by a computing system to respond to queries of users. The data structure comprises a server identifier field that is indicative of a server for responding to queries and a partition field that is indicative of a primary partition and a secondary partition stored on the server. Both the primary partition and the secondary partition includes pre-cached query results for queries.

In accordance with further aspects of this invention, a computer-readable medium form of the invention includes a data structure stored thereon for use by a computing system to respond to queries of users. The data structure comprises an identifier field that is indicative of a query; a timestamp field that is indicative of a date on which a corresponding query result of the query was updated; and a count field that is indicative of a number of times the corresponding query result has been retrieved by users since the date on which the corresponding query result for the query was refreshed.

In accordance with further aspects of this invention, a method form of the invention includes a computer-implemented method for responding to queries that comprises pre-caching query results by executing the queries prior to any search requests; distributing the pre-cached query results into multiple partitions; and responding to a query by obtaining a corresponding pre-cached query result.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3D is a structured diagram illustrating a portion of a file used by a pre-cache subsystem for responding to queries, according to one embodiment of the present invention.

FIG. 3E is a block diagram of pieces of a system, and more particularly, front-end Web servers, each containing a partition of distributed pre-cached query results, according to one embodiment of the present invention.

FIG. 3F is a structured diagram illustrating a portion of a file used by a pre-cache subsystem for responding to queries, according to one embodiment of the present invention.

FIGS. 4A-4I are process diagrams illustrating a method for pre-caching query results and refreshing these query results so as to enhance performance of a networked system, according to one embodiment of the present invention.

DETAILED DESCRIPTION OF THE PREFERRED EMBODIMENT

Figure 1:
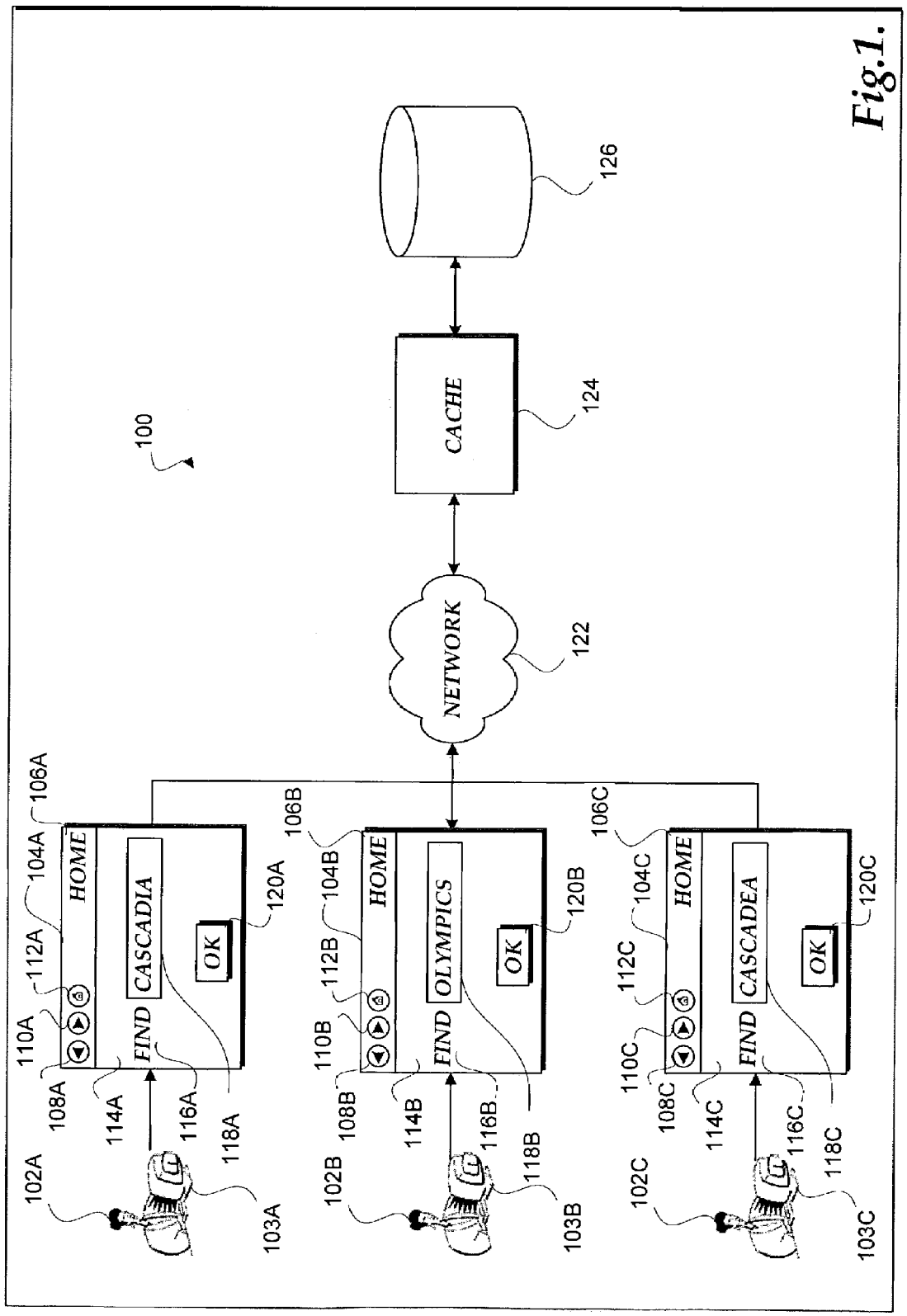
FIG. 1 is a block diagram illustrating a conventional system showing various problems of database queries.
Figure 2:
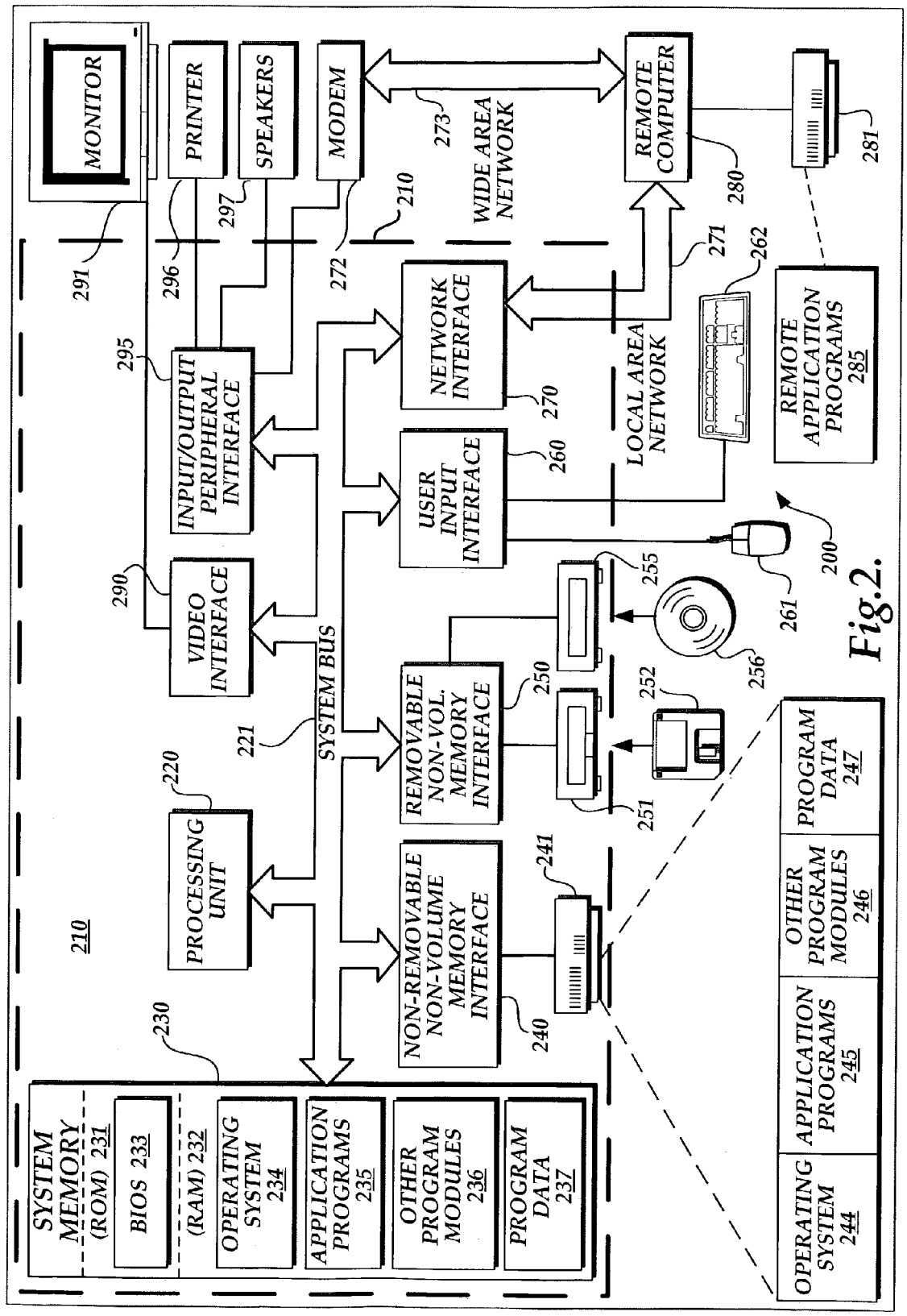
FIG. 2 is a block diagram illustrating an exemplary computing device.

FIG. 2 illustrates an example of a computing system environment 200 suitable for practicing certain aspects of the invention, such as a pre-cache subsystem for responding to queries in a networked environment that has many users, many pieces of information, and many varying queries. The computing system environment 200 is only one example of a suitable computing environment and is not intended to suggest any limitation as to the scope of use of functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc. that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

Too many users, too many pieces of information, and too many different queries all cause retrieval of information from a database within a short amount of time to be nearly impossible. Various embodiments of the present invention reduce or solve this problem by avoiding the use of a cache and instead pre-cache query results for a substantial portion of or all of the queries that are likely to be issued by users. Pre-cache query results avoid the need to access the database except for refresh purposes, thereby reducing or eliminating the need to procure additional database servers. Various embodiments of the present invention can be used for a system with one user or for systems with multiple users. Information size does not matter because information is flattened via the pre-cache process, hence easing retrieval. One query can be entirely different from another query and yet because corresponding query results are pre-cached, the database need not be accessed, improving response performance. Pre-cache queries are also distributed into multiple partitions to apportion work among multiple computing machines to further enhance performance and provide redundancy in case of the failure of any particular partition. Pre-cache query results are selectively refreshed so that users may enjoy up-to-date information but also to prevent overtaxing the database by focusing on queries that are popular (frequency of use) as well as queries that are old (inhibition of staleness).

Figure 3A:
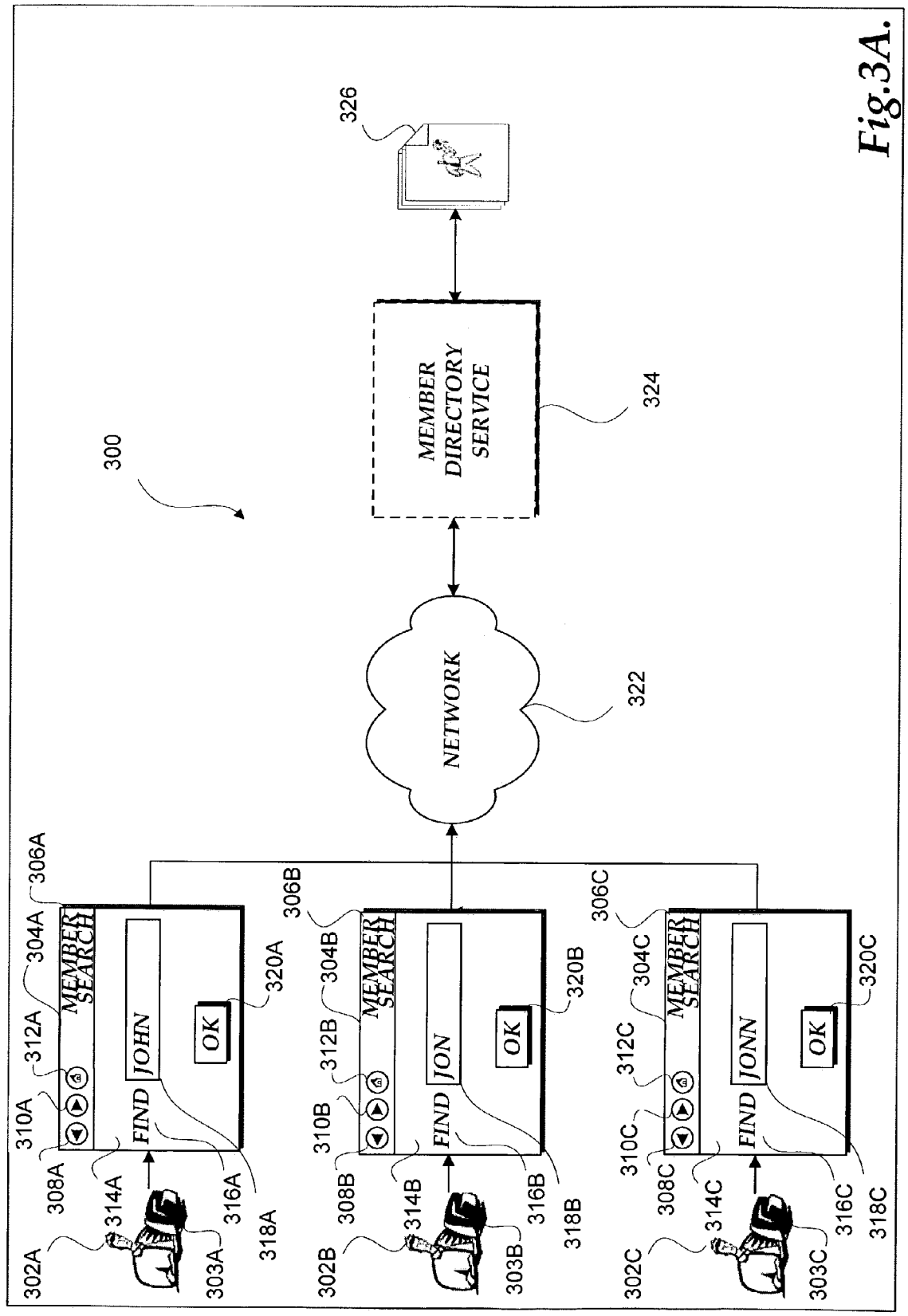
FIG. 3A is a block diagram illustrating pieces of a system that has a pre-cache subsystem for responding to queries, according to one embodiment of the present invention.

A system 300 in which pre-cached query results are used is illustrated in FIG. 3A. The system 300 is a networked computing environment that has pieces of hardware and software applications. Users 302A-302C access the resources of the network computing environment 300 via personal computers 303A-303C. Personal computers 303A-303C are designed for use by one person at a time. Personal computers 303A-303C need not share the processing, disk, and printer resources of another computer, unless each of them is also networked.

A number of applications 304A-304C run on personal computers 303A-303C, which are designed to assist users 302A-302C in the performance of various tasks, such as issuing queries to search for a person who, like users 302A-302C, is a member of an online service. Applications 304A-304C, if they are Web browsers, are software running on personal computers 303A-303C that let users 302A-302C view HTML documents and access file and software, such as a search process, related to those documents on the member directory service 324. Applications 304A-304C include a number of tools for navigation, such as Back buttons 308A-308C, Forward buttons 310A-310C, and Home buttons 312A-312C. These buttons are positioned on navigation bars 306A-306C that contain the name of the Web page ("MEMBER SEARCH"). Frames 314A-314C are each a rectangular space containing and defining the portion of an on-screen window displayed by applications 304A-304C to showcase certain functionalities, such as find functions 316A-316C. A user among users 302A-302C uses one of the find functions 316A-316C to find profiles of members stored on the member directory service 324 by entering a query into one of the text boxes 318A-318C and selecting one of the OK buttons 320A-320C to execute the query. For example, the user 302A enters the query "JOHN" into the text box 318A, the user 302B writes the query "JON" in the text box 318B, and the user 302C types the query "JONN" in the text box 318C. Execution of these queries occurs when users 302A-302C click on OK buttons 320A-320C. The member directory service 324 returns to users 302A-302C the corresponding pre-cached query results for these queries without having to access one or more databases. In sum, applications 304A-304C gain access to a member directory service 324, which enables users 302A-302C to locate other people who are members of the same on-line service using pre-cached query results, via a network 322.

The network 322 is a group of computers and associated devices that are connected by communications facilities. The network 322 can involve permanent connections, such as coaxial or other cables, or temporary connections made through telephone or other communication links. The network 322 can be as small as a LAN (Local Area Network) consisting of a few computers, printers, and other devices, or it can consist of many small and large computers distributed over a vast geographical area (WAN or Wide Area Network). One exemplary implementation of a WAN is the Internet, which is a worldwide collection of networks and gateways that use the TCP/IP suite of protocols to communicate with one another. At the heart of the Internet is a backbone of high-speed data communication lines between major nodes or host computers, including thousands of commercial, government, educational, and other computer systems that route data and messages. One or more Internet nodes can go offline without endangering the Internet as a whole or causing communications on the Internet to stop, because no single computer or network controls the entire Internet.

Figure 3B:
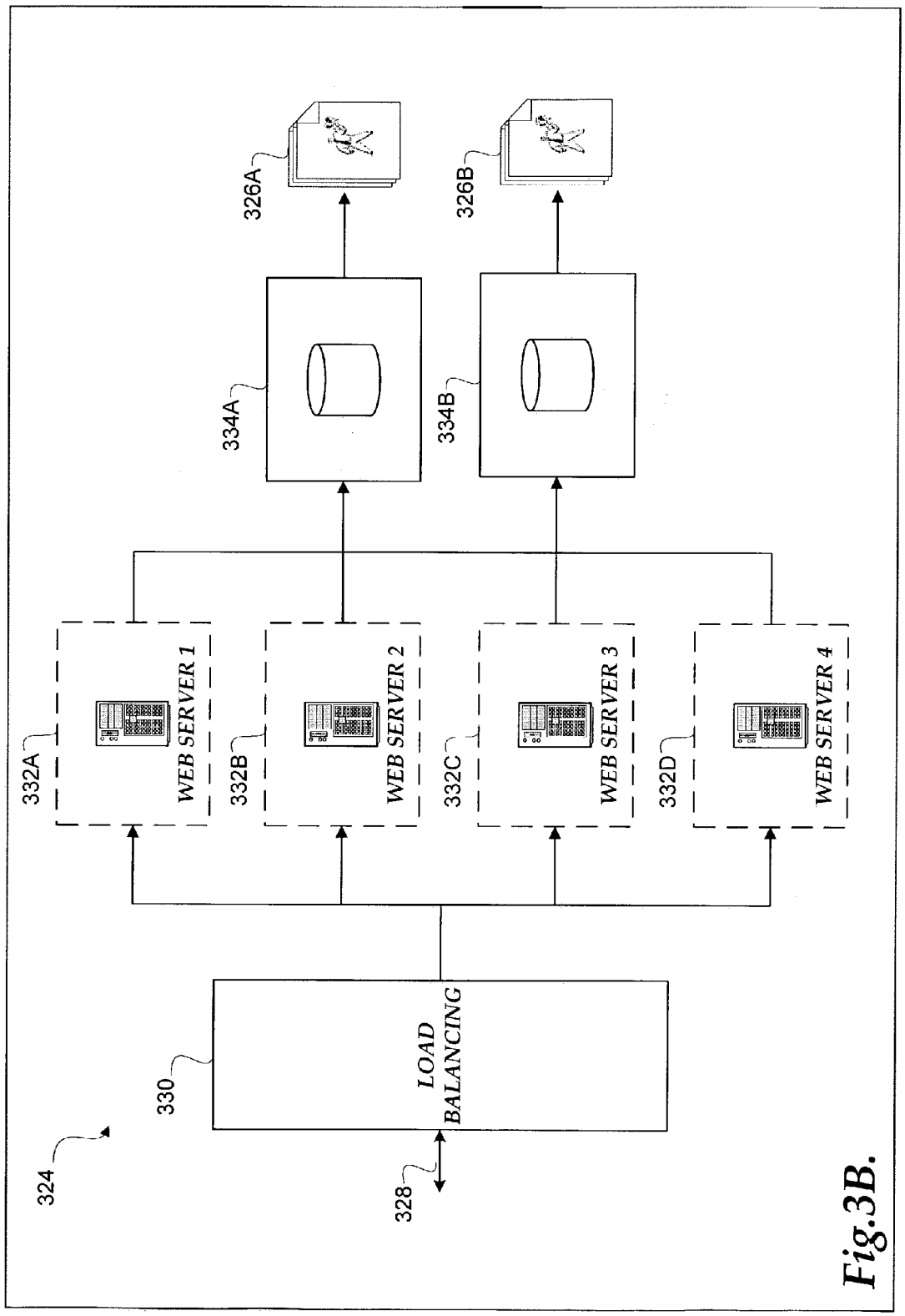
FIG. 3B is a block diagram illustrating pieces of a system, and more particularly, front-end Web servers, each including a pre-cache subsystem for responding to queries, according to one embodiment of the present invention.

The member directory service 324 stores profiles of members of an online service, such as a set of profiles 326, that users, such as users 302A-302C, have created to share information about themselves with others. These profiles comprise properties, such as a unique nickname; first and last name; age; gender; marital status; country; city; occupation; interest category; a personal statement; a favorite quote; favorite things; hobbies; a personalized home page URL; a URL where a photo of the user can be located; and mature content. The profiles of the member directory service 324 are pre-cached so as to enhance the response performance to queries of users 302A-302C regarding these profiles. However, any pieces of information in addition to these profiles can be pre-cached to benefit from enhanced response performance. A more detailed block diagram of the member directory service 324 is illustrated in FIG. 3B.

The member directory service 324 uses a load balancing component 330, which is the first stage to receive a query 328 from one of the applications 304A-304C (collectively illustrated as line 328). The query 328 is formed from any suitable protocols. One suitable protocol includes SOAP (Simple Object Access Protocol), which is a simple, XML-based protocol for exchanging structured and typed information on the Web. In distributive processing, load balancing distributes activities across two or more servers in order to avoid overloading any one server with too many requests from users, such as users 302A-302C. Load balancing can be either static or dynamic. In the static case, the load is balanced ahead of time by assigning different groups of users to different servers. In the dynamic case, however, the software refers incoming requests at run time to whichever server is most capable of handling them.

The load balancing component 330 directs the query 328 to one among a number of Web servers 332A-332D, which are servers utilizing HTTP to deliver worldwide Web documents. The cluster of Web servers 332A-332D can be formed by utilizing a Web farm. Each Web server 332A-332D unravels the protocol envelope of the query 328. Any suitable software can be run on any suitable servers, such as Web servers 332A-332C.

When the query 328 has been reconstituted, instead of immediately presenting the query 328 to one of multiple databases 334A, 334B to find a profile among profiles 326A, 326B, the assigned Web server 332A-332D uses its pre-cache subsystem to access its pre-cached query results to determine whether a query result for the query 328 can immediately be found without having to access databases 334A, 334B. Pre-cached query results enhance response performance to the queries of users 302A-302C without having to force databases 334A, 334B to laboriously find the needed information.

Databases 334A, 334B are each basically a file composed of records, each containing fields together with a set of operations for searching, sorting, recombining, and performing other database functions. Each record of databases 334A, 334B has a data structure, which is typically characterized by rows and columns, with data occupying or potentially occupying each cell formed by a row-column intersection. Profiles 326A, 326B, therefore have a data structure for describing their information, and which is searchable by users 302A-302C by issuing queries to the member directory service 324.

As mentioned above, each Web server 332A-332D intercepts a query, and instead of immediately forwarding such a query to databases 334A, 334B, each Web server 332A-332D can determine, using its pre-cache subsystem whether it can immediately respond to the query without causing databases 334A, 334B to undergo intensive retrieval operations. Such a pre-cache subsystem exists in each of the Web servers 332A-332D and is described in greater detail with respect to FIG. 3C.

Figure 3C:
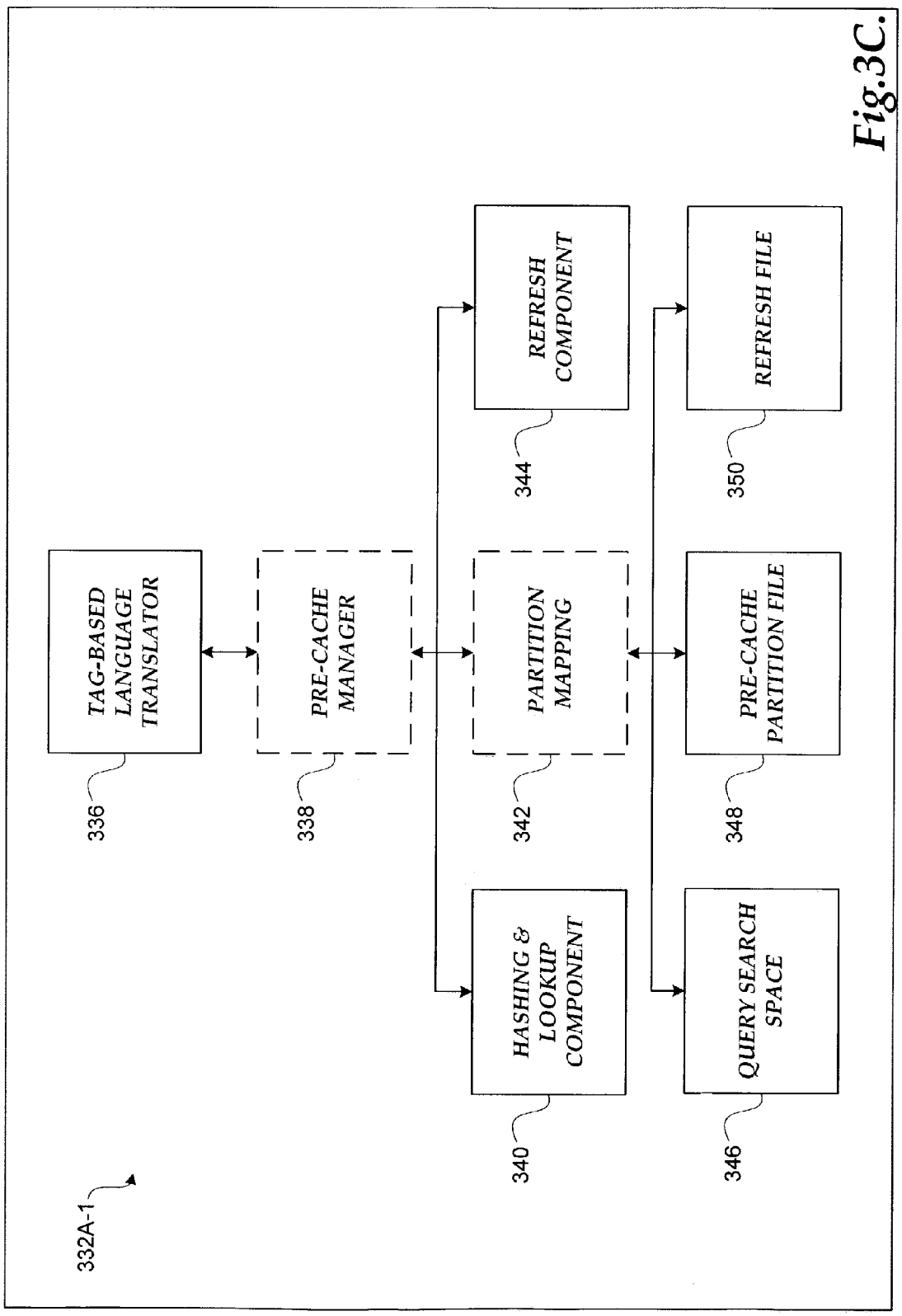
FIG. 3C is a block diagram illustrating components of a pre-cache subsystem for responding to queries, according to one embodiment of the present invention.

FIG. 3C illustrates a pre-cache subsystem 332A-1 being executed on the Web server 332A. The pre-cache subsystem 332A-1 includes a tag-based language translator 336, which is a component that unravels the protocol envelope of the query 328 by stripping from the query 328 protocol-specific codes into a form that can be processed by the pre-cache subsystem 332A-1. The tag-based language translator 336 also translates a query result of the query 328 into a protocol form, such as HTML, that is understandable by applications 304A-304C for presentation to users 302A-302C. The pre-cache subsystem 332A-1 also includes a pre-cache manager 338 that comprises multiple components 340-344. The component 340 is a hashing and lookup component; the component 342 is a partition mapping component; and the component 344 is a refresh component.

The hashing and lookup component 340 has two functions. The hashing function maps the query 328 to a numerical value that is indicative of a partition containing the query result for that query on one among multiple Web servers 332A-332D. Hashing, in the idiom of computer science, is used to convert an identifier or key (in this case, a query) meaningful to a user, such as users 302A-302C, into a value for the location of the corresponding data in a structure, such as a partition on one of multiple Web servers 332A-332D. Hashing allows fairly uniform distribution of query results among multiple Web servers 332A-332D without unduly taxing the performance of any one of them.

When a query is issued by users 302A-302C, the query is typically in textual form, such as a string. The query is then placed as a parameter to the hashing function of the component 340, and the hashing function responsively returns a numerical value that is indicative of the partition containing a query result for the query. However, query results are stored in files, which in turn are stored in partitions. Thus, finding the partition is only part of finding the query result for the query. The second function of the component 340, the lookup function, maps the query to a file name of a file containing the query result. In operation, the query (in string form) is placed as a parameter into the lookup function to map to the file name of the file containing the query result of the query.

The pre-cache manager 338 includes a partition mapping 342, which comprises three pieces of information: A query search space 346, a portion of which is illustrated in greater detail in FIG. 3D, contains a collection of valid queries in binary form (preferably in memory and whose mapping mathematically corresponds to search strings and corresponding partitions on which query results for queries can be found). A pre-cache partition file 348 contains a mapping of partitions to corresponding Web servers 332A-332D. A portion of the pre-cache partition file 348 is illustrated in greater detail at FIG. 3F. A refresh file 350 (or may be in memory) contains a mapping of queries to corresponding lastupdate timestamps (each being indicative of a date on which a particular query result was refreshed), and corresponding counts (each being indicative of the number of times a particular query result has been retrieved by users 302A-302C since the particular query result was refreshed). The refresh file 350 is used by a refresh component 344 to determine which query result to refresh by executing the corresponding query on the databases 334A, 334B.

Focusing now on the query search space 346, a portion of the query search space 346 illustrated in FIG. 3D is shown in table form so as to facilitate the discussion of its contents, but the query search space 346 can be in any suitable format. Each cell in the table contains pieces of information relating to the query search space and each cell can be identified by a row-column intersection. To better illustrate the contents of the query search space 346, the following example is used: Suppose the search space of the system 300 comprises two keys A, B (or query categories: apples and bananas). The key A is a set of three members: A1, A2, and A3 (e.g., three types of apple). The key B is a set of four members: B1, B2, B3, and B4 (four types of banana). Sets A, B together form permutations of all valid queries (there are 12 for sets A, B).

Expanding on the use of the sets A, B to define all possible but valid queries (query permutations), columns 346CA-346CG indicate a complete query permutation in binary format formed from the members of the sets A, B. Columns 346CA-346CC indicate the members of the set A. Columns 346CD-346CG indicate the members of the set B. A search string entered by users 302A-302C corresponds to a query permutation. For example, to search for B4 (a type of banana) in the set B, one of the users 302A-302C would type in one of the text boxes 318A-318C the string "B=B4". A partition that stores a query result is associated with a corresponding query permutation.

Row 346RA contains categorical nomenclatures to help make the function of each column more explicit. Rows 346RB-346RH are records of query permutations which can be mathematically map (via a hashing function) to corresponding search string information, and partition information. More particularly, the record at row 346RB, columns 346CA-346CJ contains the query permutation "0000001" in binary form indicating that no search term for the set A is selected but the search term B4 of the set B is selected. The record at row 346RC, columns 346CA-346CJ, contains the query permutation "0000010" in binary form, which indicates that no search term for the set A is selected but the search term B3 of the set B is selected. The record at row 346RD, columns 346CA-3446CJ contains the query permutation "0000100", which indicates that no search term for the set A is selected but the search term B2 for the set B is selected. Graphically, an undulating ridge separates the query search space 346 illustrated in FIG. 3D into two portions signifying that there are other query permutations between the two portions not shown for brevity purposes. The record at row 346RE, columns 346CA-346CJ contains the query permutation "1000000", which indicates that the search term A1 of the set A is selected but no search term in the set B is selected. The record at row 346RF, columns 346CA-346CJ contains the query permutation "1000001" which indicates that the search term A1 of the set A and the search term B4 of the set B are selected. The record at row 346RG, columns 346CA-346CJ contains the query permutation "1000010" in binary form, which indicates that the search term A1 of the set A and the search term B3 of the set B are selected. The record at row 346RH, columns 346CA-346CJ contains the query permutation "1000100", which indicates that the search term A1 of the set A and the search terms B2 of the set B is selected.

Each query permutation discussed above is in binary form (base 2), but it need not be so. Any suitable numbering system can be used, such as the decimal numbering system (base 10), which is preferred. The search strings for corresponding query permutations can be mapped to corresponding partitions using a hashing function. In other words, each search string is a key that can unlock information regarding the partition in which a query result can be found for a query represented by the search string. Search strings can also be mapped to corresponding query permutations (columns 346CA-346CG) to determine the name of a file that contains the query result for the query represented by the search string. The hashing and lookup component 340, therefore, uses the query search space 346 to describe the layout and the associations of query permutations, search strings, and partitions, and to translate a search string to a partition where the query result may exist and the name of the file containing the query result.

Focusing now on pre-cache partition file 348, a portion of pre-cached partition file 348 illustrated in FIG. 3F is shown in table form so as to facilitate the discussion of its contents, but the pre-cached partition file 348 can be in any suitable format. Each cell in the table contains pieces of information relating to pre-cached partition file 348 and each cell can be identified by a row-column intersection. The table form of the pre-cached partition file 348 has a number of cells at row-column intersections. Column 348CA identifies Web servers 332A-332D (Web servers 1, 2, 3, and 4). Column 348CB contains cells that have identifying information regarding the partitions residing on Web servers 332A-332D. Row 348RA identifies the functional categories of columns 348CA (WEB SERVER) and 348CB (PARTITION). The record at row 348RB, column 348CA identifies Web server 1 332A; and the partitions on the Web server 1 332A, which are "P1, P4" where the designation before the comma is a primary partition and the designation after the comma is a secondary partition. In other words, the Web server 1 332A contains the primary partition P1 (whose secondary partition is on another Web server) and the secondary partition P4 (whose primary partition is on another Web server). The record at row 348RC, columns 348CA-348CB identifies the Web server 2 322B, and partitions "P2, P1" residing on the Web server 2 332B. The record at row 348RD, columns 348CA-348CB identifies the Web server 3 332C, and partitions "P3, P2" residing on the Web server 3 332C. The record at row 348RE, columns 348CA-348CB identifies the Web server 4 332D, and partitions "P4, P3" residing on the Web server 4 332D. In operation, after the hashing and lookup component 340 hashes a search string representing a query to a particular partition, the pre-cached partition file 348 is consulted to map the found partition to a particular Web server 332A-332D where a file containing a query result for the query may be found. As indicated above, the name of the file containing the query result is the numerical transformation of the query itself preferably in decimal format. For example, the name of the file containing the query result for the search string "B=B4" is "1" (decimal format) or "0000001" (binary format).

Various embodiments of the present invention determine a search space in which a substantial number of or all queries are enumerated so as to be identifiable as a set of query permutations. Each valid query is pre-cached, which means that the query is executed on a database to obtain the query result. This execution occurs a priori or is formed prior to any presentation of search requests from users. After valid queries are executed and query results are formed, the size of the collection of query results may occupy a large amount of storage space, making administration and retrieval operations difficult. Various embodiments of the present invention distribute, apportion, divide, or scatter the collection of query results into multiple partitions. Each partition is then placed on a server, such as Web servers 332A-332D, to quickly respond to search requests of users.

FIG. 3E illustrates exemplary distributed pre-cached query results. As discussed above, Web servers 332A-332D are each a computer or program that responds to search requests in the form of a query from multiple users. The Web server 1 332A contains the primary partition "P1" 352A and the secondary partition "P4" 354A. Stored in these partitions are a set of query result files 362, whose names correspond to query permutations in a desired numerical system (preferably decimal). When it is determined that a query result file can be found in a partition, the primary partition is typically accessed first to find the query result file. The secondary partition is accessed secondarily if the query result file cannot be found in the primary partition or if the query result file in the primary partition is too old. Each secondary partition is a mirror of the primary partition that duplicates the contents of one partition so that if one partition fails, the other partition can be used to provide continued service to users. The counterpart to the primary partition "P1" 352A is the secondary partition "P1" 352B found on the Web server 2 332B. The counterpart to secondary partition "P4" 354A is the primary partition "P4" 354B found on the Web server 4 332D. The Web server 2 332B has the primary partition "P2" 356A, and its counterpart is the secondary partition "P2" 356B found on the Web server 3 332C. The Web server 3 332C has the primary partition "P3" 360A and its counterpart is the secondary partition "P3" 360B found on the Web server 4 332D. Each of these partitions contains a set of query result files 362-368. Each of these partitions is preferably stored in a remotely accessible directory so that any query result files 362-368 can be accessed by Web server 332A-332D no matter which Web server is the active Web server responding to the query.

Figure 3G:
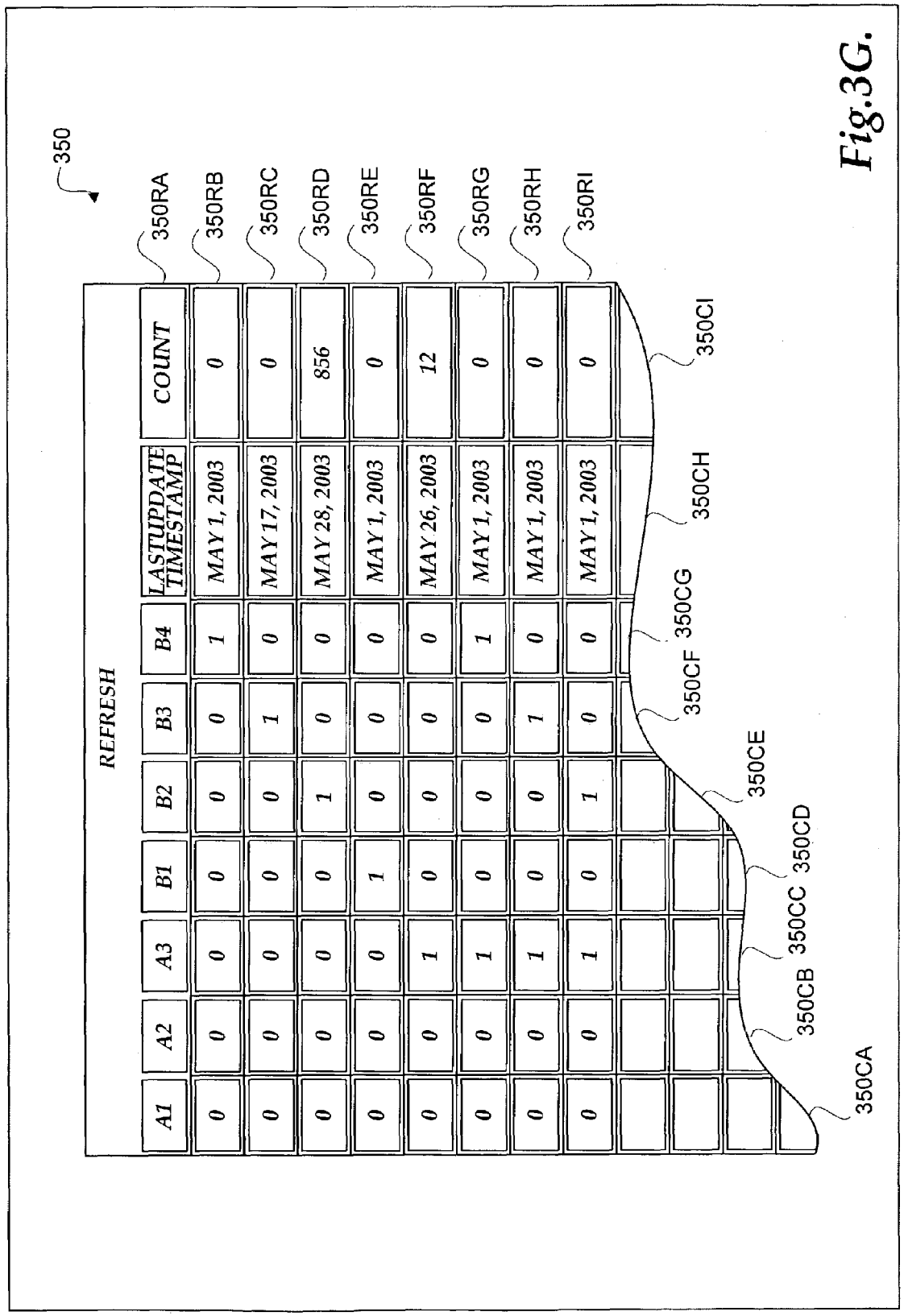
FIG. 3G is a structured diagram illustrating a portion of a file used by a pre-cache subsystem for refreshing query results, according to one embodiment of the present invention.
Figure 4A:
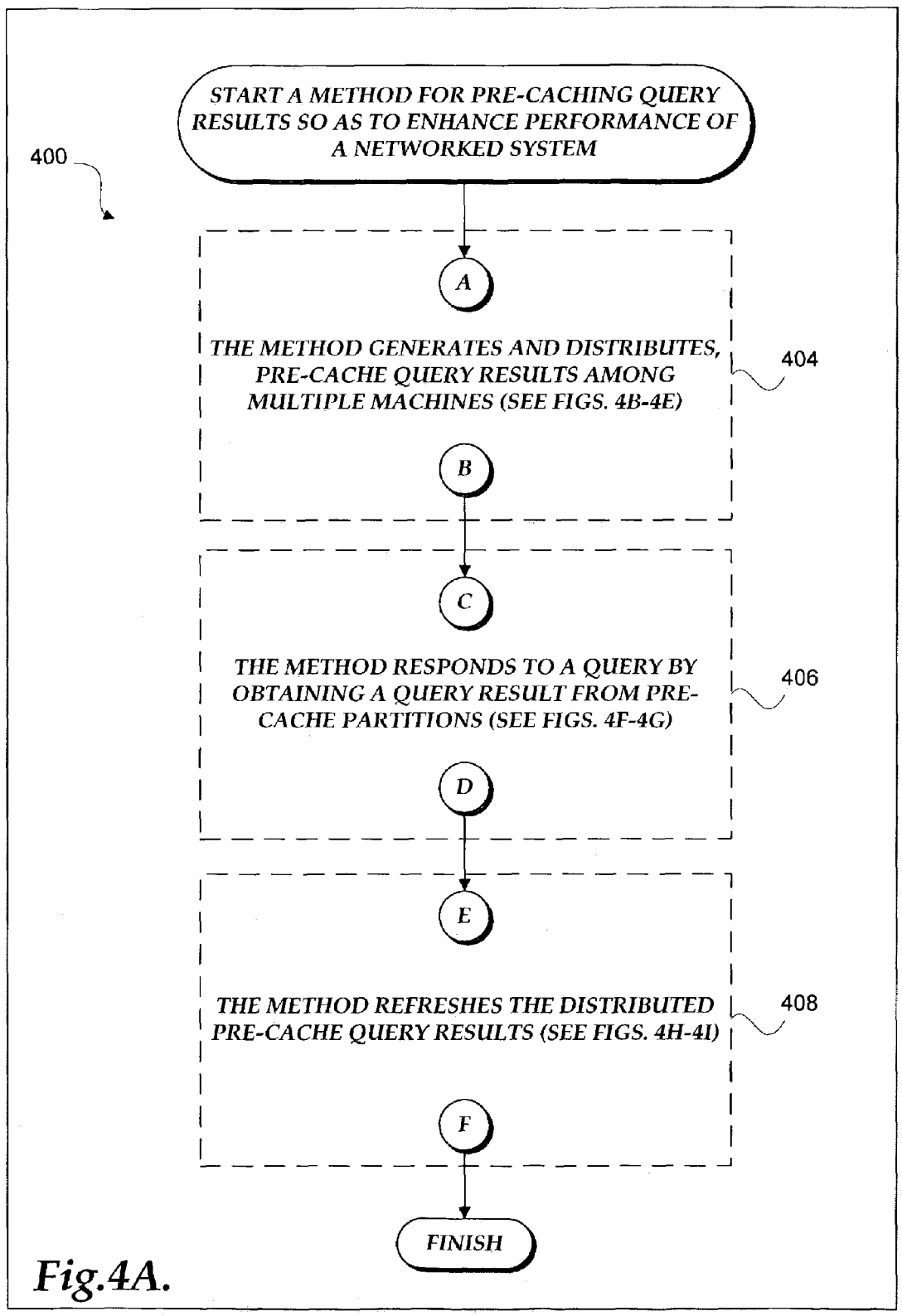
Figure 4G:
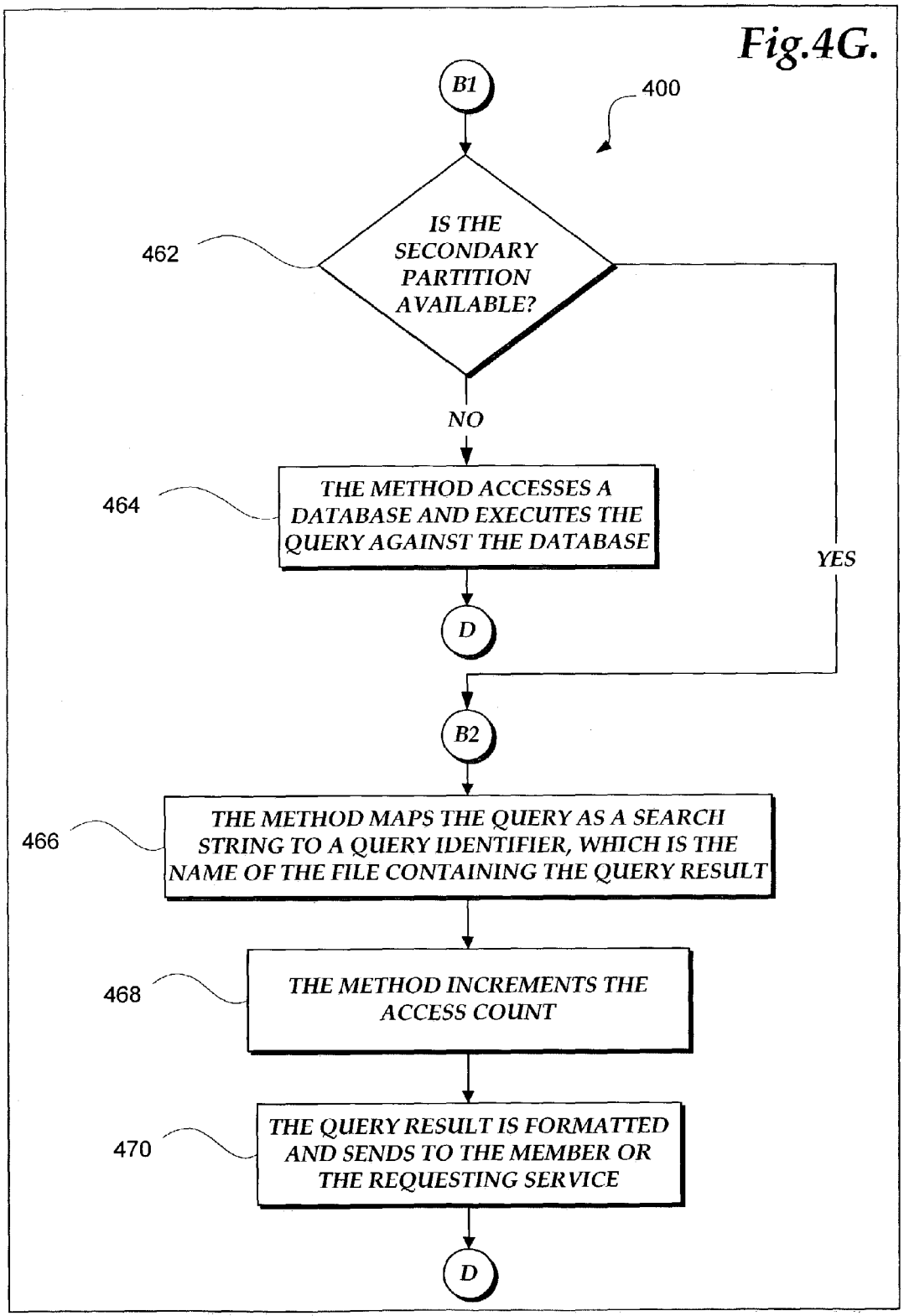
Figure 4H:
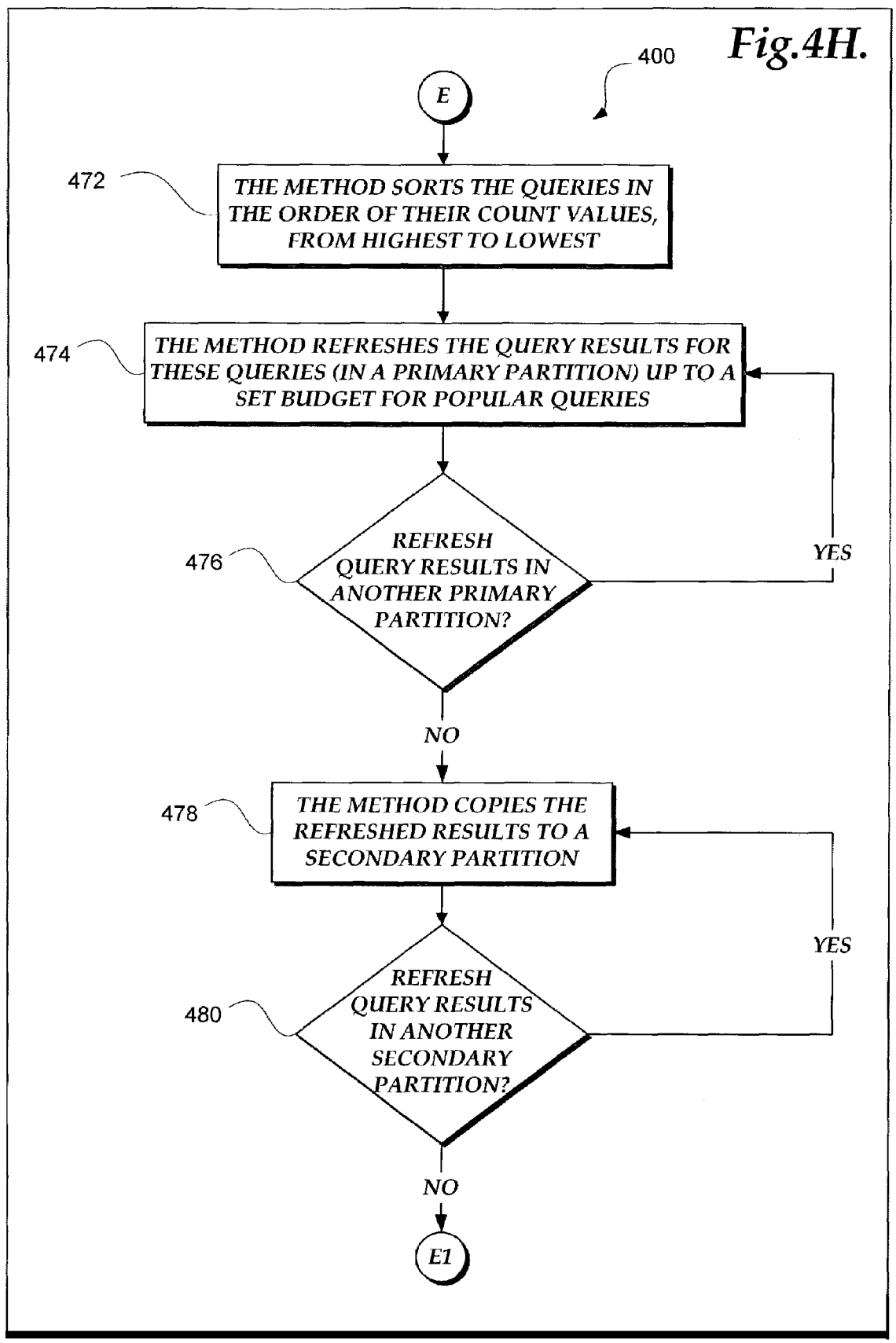

Various embodiments of the present invention pre-cache query results so that databases need not be accessed, which can be too slow in responding to users' queries. Because information in a database may change after a query result has been formed by the execution of the query, various embodiments of the present invention refresh the query results so as to renew old data. Various embodiments of the present invention use the refresh component 344 which in turn uses the refresh file 350 to accomplish this task. The refresh file 350 is illustrated at FIG. 3G in table form to facilitate discussion, but any suitable format can be used.

Cells in the table of the refresh file 350 contain information and are referenced by row-column intersections. Columns 350CA-350CG indicate members of sets A, B discussed above whose combinations form query permutations in binary form. Column 350CH contains cells whose contents are timestamps of corresponding query permutations. Each timestamp records the last date on which a corresponding query result was refreshed. Column 350CI contains cells whose contents are counts of corresponding query permutations. These counts are indicative of the number of times that a particular query has been requested by users since the particular query was last refreshed.

Cells contained in row 350RA contain categories or textual descriptions of columns 350CA-350CI. The record at row 350RB, columns 350CA-350C contains the query permutation "0000001"; the lastupdate timestamp is May 1, 2003; and the count is "0", signifying that this query permutation has not been requested by users. The record at row 350RC, columns 350CA-350CI contains the query permutation "0000010"; the lastupdate timestamp is May 17, 2003; and the count is 0, signifying that this query permutation has not been refreshed since May 17, 2003. The record at row 350RD, columns 350CA-350CI contains the query permutation "0000100"; the lastupdate timestamp is May 28, 2003; and the count is 856, signifying that the query result for the query result for this query has been retrieved about 856 times by users. The record at row 350RE, columns 350CA-350CI contains the query permutation "0001000"; the lastupdate timestamp is May 1, 2003; and the count is 0. The record at row 350RF, columns 350CA-350CI contains the query permutation "0010000"; the lastupdate timestamp is May 26, 2003; and the count is 12. The record at row 350RG, columns 350CA-350CI contains the query permutation "00100011"; the lastupdate timestamp is May 1, 2003; and the count is 0. The record at row 350RH, columns 350CA-350CI contains the query permutation "0010010"; the lastupdate timestamp is May 1, 2003; and the count is 0. The record at row 350RI, columns 350CA-350CI contains the query permutation "0010100"; the lastupdate timestamp is May 1, 2003; and the count 0.

During the refresh operation, the refresh component 344 first sorts the refresh file 350 by the count column 350CI in ascending order. Sorting by counts reveals those query permutations that are more popular with users (based on the number of times users have requested them). Various embodiments of the present invention refresh these popular queries by executing these queries on databases 334A, 334B to obtain new query results. It is preferred that not all popular queries are refreshed at the same time. Instead, a budget (i.e., a predetermined number of queries) is set to prevent overloading the databases 334A, 334B with refresh requests.

After queries that have high count values have been refreshed, the refresh component 344 sorts the refresh file 350 once again, but this time by using the lastupdate timestamps column 350CH, listed in order of by the oldest dates. The refresh component 344 then proceeds to refresh the oldest queries by executing these queries on databases 334A, 334B. However, like the popular queries, it is preferred that not all aged queries are refreshed so as to avoid taxing databases 334A, 334B. Instead, a budget for aged queries is preferably set (e.g., 1,000 queries). This refreshing technique allows query results for the more popular queries as well as for the older queries to be renewed so that users can have more up-to-date information.

FIGS. 4A-4H illustrate a method 400 for pre-caching query results so as to enhance the performance of a networked system. For clarity purposes, the following description of the method 400 makes references to various elements illustrated in connection with the system 300 (FIG. 3A), the member directory service 324 (FIG. 3B), the pre-cache subsystem 332A-1 (FIG. 3C), the query search space 346 (FIG. 3D), the partitions of query results (FIG. 3E), the pre-cache partition file 348 (FIG. 3F), and the refresh file 350 (FIG. 3G). From a start block, the method 400 proceeds to a set of method steps 404, defined between a continuation terminal ("terminal A") and an exit terminal ("terminal B"). The set of method steps 404 describes the generation and distribution of pre-cached query results among multiple machines, such as Web servers 332A-332C.

From terminal A (FIG. 4B), the method 400 proceeds to block 410 where the method creates an identifier for a query permutation. The identifier can be formed using any suitable reference systems. One preferred reference system is a numerical system in base 10 (decimal). The identifier should preferably symbolize the search terms of the query itself. For example, the identifier for the query permutation at row 346RC, columns 346CA-346CG in FIG. 3D is in binary form ("0000001") which indicates that no search term of the set A is selected and the search term B4 of the set B is selected.

The method 400 then proceeds to decision block 416 where it is determined whether there are more queries. If the answer is YES, the method 400 loops back to block 410 where the above-described processing steps are repeated. Otherwise, the answer is NO, and the method 400 creates a query search base file 346 to capture all valid query permutations. See block 418.

Next, at block 420, the method 400 distributes the valid query permutations among multiple partitions. As explained above, the method 400 uses a hashing function to map multiple query permutations to multiple partitions so as to avoid using a contiguous, large partition to store all query results for all query permutations. The method then enters another continuation terminal ("terminal A1").

From terminal A1 (FIG. 4C), the method 400 assigns each partition (primary partition) such as partitions 352A, 356A, 360A, and 354B, to a machine, such as Web servers 332A-332D, and a copy of the partition (secondary partition), such as partitions 354A, 352B, 356B, 360B, to another machine, such as Web servers 332A-332D. See block 422. The method 400 creates the pre-cached partition file 348 to capture the partition assignments and updates the query search space 346. See block 424.

Next, the method 400 determines whether there are valid query permutations in the query search space 346. See decision block 426. If the answer to the test at decision block 426 is YES, the method 400 executes a valid query in a database, such as databases 334A, 334B to obtain a query result for the query. See block 428. The method 400 then stores the query result under a file whose name is the identifier of the executed query. See block 430. For example, the name of the file containing the query result for the query permutation at row 346RC, columns 346CA-346CG is "0000001" (in binary form) or "1" (in decimal form). See block 430. At block 432, the method 400 places the query result file in a remotely accessible directory at the machine assigned to store the partition. For example, the query search space 346 indicates that the query permutation "0000001" (row 346RC, columns 346CA-346CG) corresponds to partition "P1". The pre-cached partition file 348 indicates that the primary partition "P1" is allocated to Web server 1-332A (see row 340RB, columns 340CA-340CB), and the secondary partition "P1" is allocated to Web server 2 332B (see row 340RC, columns 340CA-340CB).

The method then loops back to decision block 426 where the above-described processing steps are repeated. If the answer to the test at decision block 426 is NO, another continuation terminal ("terminal A2") is entered.

From terminal A2 (FIG. 4D), the method 400 proceeds to block 434 where, on start-up, the method 400 examines a query result file for a corresponding query. A test is made to determine whether the query result file is missing. See decision block 436. If the answer to the test at decision block 436 is YES, another continuation terminal ("terminal A3") is entered by the method 400. Otherwise, the answer is NO, and another test is made to determine whether the query result file actually belongs to the partition. See decision block 438. If the answer to the test at decision block 438 is YES, another continuation terminal ("terminal A4") is entered by the method 400. Otherwise, the answer is NO, and the method 400 discards the query result file. See block 440. One reason that this may occur is because there has been a change in the query search base file 346 to accommodate additional queries or to remove unnecessary queries. The mapping of the hashing function therefore has been changed. Furthermore, the query result file may no longer be contained in the correct partition. See block 440. Another test is made to determine whether there are more query result files to be checked. See decision block 442. If the answer to the test at decision block 442 is YES, the method 400 loops back to block 434 where the above-described processing steps are repeated. Otherwise, the answer is NO, and the method 400 proceeds to terminal B.

From terminal A3 (FIG. 4E), a test is made to determine whether there is another query result file for duplication, such as a query result file in a secondary partition. If the answer to the test at decision block 444 is NO, the method 400 queues the query (for which the query result file is missing) to databases 334A, 334B to generate a new query result. See block 446. The method 400 then enters another continuation terminal ("terminal A5"), which loops back to decision block 442 where the above-described processing steps are repeated. If the answer to the test at decision block 444 is YES, the method 400 proceeds to block 448 where the method 400 copies the query result file from either a primary partition or secondary partition. The method 400 then enters terminal A5 to loop back to decision block 442 and repeats the above-described processing steps.

From terminal A4 (FIG. 4E), a test is made to determine whether the query result file has expired. See decision block

450. If the answer to the test at decision block 450 is YES, the method 400 loops back to block 448 where the above-described processing steps are repeated. Otherwise, the answer is NO, and the method 400 enters terminal A5 to loop back to decision block 442 and repeats the above-described processing steps.

From terminal B (FIG. 4A), the method 400 proceeds to a set of method steps 406, defined between a continuation terminal ("terminal C") and an exit terminal ("terminal D"). The set of method steps 406 describes a response to a query of the user by obtaining a query result from one among multiple pre-cache partitions.

From terminal C (FIG. 4F), a member of an on-line service or a requesting service sends a query to another Web service, such as the member directory service 324. See block 452. A load balancing system 330 distributes the query to one Web server from multiple Web servers 332A-332D. See block 454. The method 400 then obtains the partition at which the result for the query resides by inputting the query (as a search string) into a hashing function. See block 456. For example, suppose the search string is "B=B4". The hashing function may map such a search string to a partition "P1". In other words, the partition "P1" is the place at which the result for the query "B=B4" resides. Using the pre-cached partition file 348, the method 400 determines the machine on which resides the primary partition that contains the query result file. See block 458. For example, the partition "P1" resides on Web server 1 332A (see row 348RB, columns 348CA-348CB) and the Web server 2 322B (see row 348RC, columns 348CA-348CB). The Web server 1 332A contains the primary partition "P1". See block 458. Next, the method 400 proceeds to decision block 460 where a test is made to determine whether the primary partition is available to obtain the query result file. If the answer is NO, another continuation terminal ("terminal B1") is entered by the method 400. Otherwise, the answer is YES, and the method 400 proceeds to another continuation terminal ("terminal B2").

From terminal B1 (FIG. 4G), the method 400 proceeds to decision block 462 where a test is made to determine whether the secondary partition is available. If the answer is YES, the method 400 continues to terminal B2. Otherwise, if the answer to the test at decision block 462 is NO, the method 400 accesses databases 334A, 334B and executes the query. See block 464. The method 400 then proceeds to terminal D.

From terminal B2 (FIG. 4G), the method 400 maps the query as a search string to a query identifier, which is the name of the file containing the query result. See block 466. For example, suppose the query search string is "B=B4". The search string "B=B4" can be corresponded to query identifier "0000001" in binary form or "1" in decimal form. (See row 346RB, columns 346CA-346CG.) That query identifier is also the name of the query result file in which the query result can be found. At block 468, the method 400 increments the access count (see the count at row 350RC, column 350CI). See block 468. The query result is then formatted by the tag-based language translator 336 into a suitable format, such as HTML or XML, and is sent back to the member of the on-line service or the requesting service. See block 470. The method 400 then continues on to terminal D.

From terminal D (FIG. 4A), the method 400 proceeds to a set of method steps 408, defined between a continuation terminal ("terminal E") and an exit terminal ("terminal F"). The set of method steps 408 describes the refresh of the distributed pre-cached query results so that users may experience more up-to-date information from their search requests.

From terminal E (FIG. 4A), the method 400 sorts the queries in the refresh file 350 in the order of their count values, from highest to lowest. See block 472. The method then refreshes the query results for these queries (in a primary partition) up to a set budget for popular queries. Popular queries are those that have a higher count values than other queries. The method 400 then proceeds to decision block 476 where it is determined whether to refresh query results in another primary partition. Part of the calculus of this test at decision block 476 is to space apart the time period in which to refresh various primary partitions so as not to overburden databases 334A, 334B. If all primary partitions were to be refreshed at once, this could unduly cause a slowdown in the performance of databases 334A, 334B. For example, one partition can be refreshed at 1:00 a.m. and the next refreshing period for another partition can occur at 3:00 a.m.

If the answer to the test at decision block 476 is YES, the method 400 loops back to block 474 where the above-described processing steps are repeated. Otherwise, the answer is NO, and the method 400 copies the refreshed results to a corresponding secondary partition. See block 478. For example, once primary partition "P1" 352A on the Web server 1 332A has been refreshed, the secondary partition "P1" 352B on the Web server 2 332B can be refreshed by merely copying the contents of the primary partition "P1" 352A. It is preferred that the refreshing process for the secondary partitions be placed apart in time so as not to overtax the copying operation of the system 300. The method 400 then proceeds to decision block 480 where it is determined whether the query results of another secondary partition are to be refreshed. Like primary partitions, the refresh process of each secondary partition should preferably be placed apart in time so as not to overburden the databases 334A, 334B. If the answer to the test at decision block 480 is YES, the method 400 loops back to block 478 where the above-described processing steps are repeated. Otherwise, the answer is NO, and another continuation terminal ("terminal E1") is entered by the method 400.

From terminal E1 (FIG. 4H), the method 400 sorts the queries in the order of their lastupdate timestamps, from oldest to newest (the refresh file 350). See block 482. The method 400 then refreshes the query results for these queries (in a primary partition) up to a set budget for stale queries. See block 484. Stale queries are those queries that have not been refreshed for a long period of time. Additionally, lastupdate timestamps for those queries are also updated. See block 484. A test is then made to determine whether query results in another primary partition should also be refreshed. See decision block 486. As indicated above, the calculus of this test is preferably made to space apart the time period in which each primary partition is refreshed so as not to overly tax databases 334A, 334B.

If the answer to the test at decision block 486 is YES, the method 400 loops back to block 484 where the above-described processing steps are repeated. If the answer is NO, the method 400 copies the refreshed results to a corresponding secondary partition. See block 488. Next, a test is made to determine whether query results in another secondary partition should be refreshed. As discussed, the refresh operation for secondary partitions should preferably be placed apart in time so as not to reduce network traffic, load on servers (for pre-caching purposes) and to increase the likelihood that a given primary partition has completed all its database queries. See decision block 490. If the answer to the test at decision block 490 is YES, the method 400 loops back to block 488 where the above-described processing steps are repeated. Otherwise, the answer is NO. The method 400 proceeds to another decision block 492, where it is determined whether to terminate the execution of the method 400. If the answer is YES, terminal F is entered and the processing of method 400 is finished. Otherwise, the answer is NO to the test at decision block 492, and the method 400 continues on to terminal C where the above-described processing steps are repeated.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A networked system for responding to a query of a user, comprising:
  an application executing on a computer for issuing the query;
  software executing on computers of the networked system for unraveling a protocol envelope of the query by stripping from the query protocol-specific codes into a form suitable for pre-caching processing by using a tag-based language translator;
  multiple servers on which multiple partitions are distributed and not on one server, each partition including a primary partition and a secondary partition, the second partition being a duplicate of the primary partition, each primary partition being located on one server and each secondary partition being located on another server, each partition containing a subset of a set of pre-cached query results;
  a service executing on another computer for responding to the query by providing a corresponding query result, the corresponding query result being found in a set of pre-cached query results, the query being mapped to a query permutation using a hashing function which uses a query search space that describes the layout and the associations of query permutations and queries, each pre-cached query result being generated by executing a corresponding query prior to issuance of the query; and
  a refresh component executing on a further computer for refreshing query permutations that are popular with users based on the number of times the users have requested them and then refreshing those whose have oldest dates of access by users.

2. The networked system of claim 1, wherein the application is a Web browser.

3. The networked system of claim 1, further comprising a network on which the query is transmitted from the application to the service.

4. The networked system of claim 1, wherein the service is a member directory service, which contains profiles of members of an online service.

5. The networked system of claim 4, wherein the corresponding query result is a portion of the profile of a member of the online service.

6. A computer system for responding to queries of users, comprising:
  multiple servers for responding to the queries of the users, a protocol envelope of the queries being unraveled by computers of the multiple servers by stripping from the queries protocol-specific codes into a form suitable for pre-caching processing by using a tag-based language translator, the queries being mapped to query permutations using a hashing function which uses a query search space that describes the layout and the associations of the query permutations and the queries;
  multiple servers on which multiple partitions are distributed and not on one server, each partition including a primary partition and a secondary partition, the second partition being a duplicate of the primary partition, each primary partition being located on one server and each secondary partition being located on another server, each partition containing a portion of pre-cached query results, each pre-cached query result being generated by executing a corresponding query prior to the time the query is requested by a user; and
  a refresh component executing on a computer for refreshing the query permutations that are popular with users based on the number of times the users have requested them and then refreshing those whose have oldest dates of access by users.

7. The computer system of claim 6, wherein each pre-cached query result is stored in a file, each file being stored in a remotely accessible directory on a server.

8. The computer system of claim 7, wherein the file has a file name, the file name being a numerical transformation of a query whose query result is contained in the file.

9. A computer system for responding to queries of users, comprising:
  a hashing component executing on the computer system for mapping a query to a partition on a server, the query being mapped to a query permutation using the hashing component which uses a query search space that describes the layout and the associations of query permutations and queries;
  a lookup component executing on the computer system for mapping the query to a filename of a file in a partition and on the server, the file containing a query result for the query, the query result being pre-cached prior to the issuance of the query by a user;
  multiple servers on which multiple partitions are distributed and not on one server, each partition including a primary partition and a secondary partition, the second partition being a duplicate of the primary partition, each primary partition being located on one server and each secondary partition being located on another server, each partition containing a portion of pre-cached query results;
  a refresh component executing on the computer system for refreshing the query permutations that are popular with users based on the number of times the users have requested them and then refreshing those whose have oldest dates of access by users; and
  software executing on computers of the computer system for unraveling a protocol envelope of the query by stripping from a query protocol-specific codes into a form suitable for pre-caching processing by using a tag-based language translator.

10. The computer system of claim 9, further comprising a refresh file in which a mapping is described regarding the correspondence of queries; access counts, each being indicative of the number of times the query result is retrieve by users since the last date on which the query result was refreshed; and update timestamps, each being indicative of the last date on which the query result was refreshed.

11. The computer system of claim 9, further comprising a query search space.

12. The computer system of claim 9, further comprising a pre-cache partition file in which a mapping is described regarding the correspondence of servers and partitions allocated to the servers.

13. A computer-implemented method for responding to queries, comprising:
   unraveling a protocol envelope of queries by a computer by stripping from the queries protocol-specific codes into a form suitable for pre-caching processing by using a tag-based language translator;
   pre-caching query results by another computer by executing the queries prior to any search requests;
   distributing the pre-cached query results by a further computer into multiple partitions;
   responding to a query by obtaining a corresponding pre-cached query result using multiple servers on which multiple partitions are distributed and not on one server, each partition including a primary partition and a secondary partition, the second partition being a duplicate of the primary partition, each primary partition being located on one server and each secondary partition being located on another server, each partition containing a portion of pre-cached query results, the query being mapped to a query permutation using a bashing function which uses a query search space that describes the layout and the associations of query permutations and queries; and
   refreshing the query permutations by a refresh component running on an additional computer that are popular with users based on the number of times the users have requested them and then refreshing those whose have oldest dates of access by users.

14. The method of claim 13, further comprising creating an identifier for a query permutation which corresponds to the query.

15. The method of claim 14, further comprising determining the validity of the query permutation.

16. The method of claim 15, further comprising determining the search string that would invoke the query permutation.

17. The method of claim 16, further comprising creating a query search space to capture all valid query permutations.

18. The method of claim 17, further comprising assigning each partition, which is defined as a primary partition, to a server and a copy of the partition, which is defined as a secondary partition, to another server.

19. The method of claim 18, further comprising creating a pre-cache partition file to capture the partition assignments among partitions and servers.

20. The method of claim 19, further comprising executing a valid query to obtain a query result.

21. The method of claim 20, further comprising storing the query result in a file, whose name is the identifier of the executed query.

22. The method of claim 21, further comprising placing the file in a remotely accessible directory at a server assigned to store a corresponding partition.

23. The method of claim 13, further comprising examining a query result file, on start-up, for a corresponding query.

24. The method of claim 23, further comprising queuing the query to a database to generate a query result file if the query result file is missing and there is not another query result file that can be duplicated.

25. The method of claim 24, further comprising copying another query result file from another partition if the query result file is missing and there is another query result file that can be duplicated.

26. The method of claim 25, further comprising discarding the query result file if the query result file has expired.

27. The method of claim 26, further comprising copying another query result file from another partition if the query result file has not expired and there is another query result file that can be duplicated.

28. The method of claim 13, further comprising receiving the query and distributing the query via a load balancing system to a server.

29. The method of claim 28, further comprising obtaining a partition at which the query result for the query resides by inputting the query as a search string into a hashing function.

30. The method of claim 29, further comprising determining a server on which resides a primary partition that contains the query result.

31. The method of claim 30, further comprising accessing a database to execute the query if neither the primary partition nor a secondary partition is available to access the query result.

32. The method of claim 30, further comprising mapping a search string to a query identifier, which is the name of a file containing the query result.

33. The method of claim 32, further comprising incrementing an access count for the query and updating a timestamp for a query result indicating a date of refresh.

34. The method of claim 33, further comprising formatting the query result into a format presentable to a user.

35. The method of claim 13, further comprising sorting a set of queries in the order of their count values.

36. The method of claim 35, further comprising refreshing a set of query results in a primary partition that corresponds to the set of queries that have the highest count values, the act of refreshing terminating when a predetermined number of query results have been refreshed.

37. The method of claim 36, further comprising copying the set of refreshed query results to a secondary partition from the primary partition.

38. The method of claim 13, further comprising sorting a set of queries in the order of their staleness.

39. The method of claim 38, further comprising refreshing a set of query results in a primary partition that corresponds to the set of queries that have the oldest timestamps, the act of refreshing terminating when a predetermined number of query results have been refreshed.

40. The method of claim 39, further comprising copying the set of refreshed query results to a secondary partition from the primary partition.

41. A computer-readable medium having computer-readable instructions stored thereon that implement a method for responding to queries, the method comprising:
   unraveling a protocol envelope of queries by executing software on computers for stripping from the queries protocol-specific codes into a form suitable for pre-caching processing by using a tag-based language translator;
   pre-caching query results by executing the queries prior to any search requests using software executing on a computer;
   distributing the pre-cached query results into multiple partitions using software executing on the computer;
   responding to a query by obtaining a corresponding pre-cached query result using multiple servers on which multiple partitions are distributed and not on one server, each partition including a primary partition and a secondary partition, the second partition being a duplicate of the primary partition, each primary partition being located on one server and each secondary partition being located on another server, each partition containing a portion of pre-cached query results, the query being mapped to a query permutation using a hashing function which uses a query search space that describes the layout and the associations of query permutations and queries; and selectively refreshing pre-cached query results using a refresh component executing on the computer by focusing on the queries that have high frequency of use and the queries that are old.

42. The method of claim 41, further comprising creating an identifier for a query permutation which corresponding to the query.

43. The method of claim 42, further comprising determining the validity of the query permutation.

44. The method of claim 43, further comprising determining the search string that would invoke the query permutation.

45. The method of claim 44, further comprising creating a query search space to capture all valid query permutations.

46. The method of claim 45, further comprising assigning each partition, which is defined as a primary partition, to a server and a copy of the partition, which is defined as a secondary partition, to another server.

47. The method of claim 46, further comprising creating a pre-cache partition file to capture the partition assignments among partitions and servers.

48. The method of claim 47, further comprising executing a valid query to obtain a query result.

49. The method of claim 48, further comprising storing the query result in a file, whose name is the identifier of the executed query.

50. The method of claim 49, further comprising placing the file in a remotely accessible directory at a server assigned to store a corresponding partition.

51. The method of claim 41, further comprising examining a query result file, on start-up, for a corresponding query.

52. The method of claim 51, further comprising queuing the query to a database to generate a query result file if the query result file is missing and there is not another query result file that can be duplicated.

53. The method of claim 52, further comprising copying another query result file from another server containing the partition if the query result file is missing and there is another query result file that can be duplicated.

54. The method of claim 53, further comprising discarding the query result file if the query result file has expired.

55. The method of claim 54, further comprising copying another query result file from another partition if the query result file has not expired and there is another query result file that can be duplicated.

56. The method of claim 41, further comprising receiving the query and distributing the query via a load balancing system to a server.

57. The method of claim 56, further comprising obtaining a partition at which the query result for the query resides by inputting the query as a search string into a hashing function.

58. The method of claim 57, further comprising determining a server on which resides a primary partition that contains the query result.

59. The method of claim 58, further comprising accessing a database to execute the query if neither a primary server containing the partition nor a secondary server containing the partition is available to access the query result.

60. The method of claim 58, further comprising mapping a search string to a query identifier, which is the name of a file containing the query result.

61. The method of claim 60, further comprising incrementing an access count for the query and updating a timestamp for the query result indicating a date of refresh.

62. The method of claim 61, further comprising formatting the query result into a format presentable to a user.

63. The method of claim 41, further comprising sorting a set of queries in the order of their count values.

64. The method of claim 63, further comprising refreshing a set of query results in a primary partition that corresponds to the set of queries that have the highest count values, the act of refreshing terminating when a predetermined number of query results have been refreshed.

65. The method of claim 64, further comprising copying the set of refreshed query results to a secondary partition from the primary partition.

66. The method of claim 41, further comprising sorting a set of queries in the order of their staleness.

67. The method of claim 66, further comprising refreshing a set of query results in a primary partition that corresponds to the set of queries that have the oldest timestamps, the act of refreshing terminating when a predetermined number of query results have been refreshed.

68. The method of claim 67, further comprising copying the set of refreshed query results to a secondary partition from the primary partition.

* * * * *